United States Patent
Zhou et al.

(10) Patent No.: US 10,338,879 B2
(45) Date of Patent: Jul. 2, 2019

(54) SYNCHRONIZATION OBJECT DETERMINING METHOD, APPARATUS, AND SYSTEM

(71) Applicant: Huawei Technologies Co., Ltd., Shenzhen (CN)

(72) Inventors: Chao Zhou, Shenzhen (CN); Menghan Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 15/363,341

(22) Filed: Nov. 29, 2016

(65) Prior Publication Data

US 2017/0153864 A1 Jun. 1, 2017

(30) Foreign Application Priority Data

Nov. 30, 2015 (CN) .......................... 2015 1 0863976

(51) Int. Cl.
*G06F 3/14* (2006.01)
*A63F 13/358* (2014.01)
(Continued)

(52) U.S. Cl.
CPC .......... *G06F 3/1454* (2013.01); *A63F 13/358* (2014.09); *G06T 19/006* (2013.01);
(Continued)

(58) Field of Classification Search
CPC ................ G06F 3/1454; G06T 19/006; G06T 2219/024; H04L 67/1095; H04L 67/38
See application file for complete search history.

(56) References Cited

U.S. PATENT DOCUMENTS

| 4,493,053 A | 1/1985 | Thompson |
| 5,606,164 A | 2/1997 | Price et al. |

(Continued)

FOREIGN PATENT DOCUMENTS

| CN | 102348276 A | 2/2012 |
| CN | 104427607 A | 3/2015 |

(Continued)

OTHER PUBLICATIONS

Machine Translation and Abstract of Chinese Publication No. CN102348276, Feb. 8, 2012, 13 pages.
(Continued)

*Primary Examiner* — Sejoon Ahn
(74) *Attorney, Agent, or Firm* — Conley Rose, P.C.

(57) ABSTRACT

The present disclosure discloses a synchronization object determining method, apparatus, and system, where the method includes determining a first distance between the first terminal and the second terminal in a display picture according to location information of the first terminal and location information of the second terminal, and predicting a second distance between the first terminal and the second terminal after specified duration in the display picture, and classifying, by the synchronization device, the second terminal as a synchronization object of the first terminal if the first distance is greater than the second distance. According to the foregoing method, a proper synchronization object is selected for each terminal according to a mobility feature of a terminal. Therefore, on the one hand, an objective of synchronization can be achieved.

10 Claims, 5 Drawing Sheets

(51) Int. Cl.
*G06T 19/00* (2011.01)
*H04L 29/08* (2006.01)
*H04L 29/06* (2006.01)

(52) U.S. Cl.
CPC .......... *H04L 67/1095* (2013.01); *H04L 67/38* (2013.01); *G06T 2219/024* (2013.01)

(56) References Cited

U.S. PATENT DOCUMENTS

| | | | |
|---|---|---|---|
| 5,912,779 | A | 6/1999 | Llewellyn et al. |
| 6,026,172 | A | 2/2000 | Lewis, Jr. et al. |
| 6,028,593 | A * | 2/2000 | Rosenberg .............. A63F 13/10 345/156 |
| 6,040,871 | A | 3/2000 | Andersson |
| 6,845,287 | B2 | 1/2005 | Galburt et al. |
| 7,294,822 | B2 | 11/2007 | Randall |
| 7,574,493 | B2 * | 8/2009 | Hutcheson .............. H04L 67/02 709/220 |
| 7,965,814 | B2 | 6/2011 | Ma et al. |
| 8,175,792 | B2 | 5/2012 | Kim et al. |
| 8,347,210 | B2 | 1/2013 | Ubillos et al. |
| 8,738,306 | B2 | 5/2014 | Ruiter et al. |
| 8,896,814 | B2 | 11/2014 | Schicketanz et al. |
| 9,928,652 | B2 * | 3/2018 | Nicholas ............ G06T 19/006 |
| 9,928,654 | B2 * | 3/2018 | Miller .................... G06F 3/011 |
| 2009/0045938 | A1 * | 2/2009 | Levien ................. G06Q 10/10 340/514 |
| 2010/0053164 | A1 * | 3/2010 | Imai ...................... G06F 3/011 345/427 |
| 2012/0233482 | A1 * | 9/2012 | Piersol ................. G06F 1/3265 713/323 |
| 2013/0102324 | A1 * | 4/2013 | Qiu ....................... H04W 4/023 455/456.1 |
| 2013/0326366 | A1 * | 12/2013 | Choi ...................... H04W 4/02 715/752 |
| 2014/0075046 | A1 | 3/2014 | Wang et al. |

FOREIGN PATENT DOCUMENTS

| | | |
|---|---|---|
| CN | 104954349 A | 9/2015 |
| EP | 2587808 A1 | 5/2013 |
| JP | H0991468 A | 4/1997 |
| KR | 20130019546 A | 2/2013 |
| WO | 2014124483 A1 | 8/2014 |

OTHER PUBLICATIONS

Machine Translation and Abstract of Chinese Publication No. CN104427607, Mar. 18, 2015, 10 pages.
Machine Translation and Abstract of Chinese Publication No. CN104954349, Sep. 30, 2015, 24 pages.
Foreign Communication From a Counterpart Application, European Application No. 16194958.1, Extended European Search Report dated Mar. 31, 2017, 8 pages.
Machine Translation and Abstract of Korean Publication No. KR20130019546, Feb. 27, 2013, 36 pages.
Machines Translation and Abstract of Japanese Publication No. JPH0991468, Apr. 4, 1997, 21 pages.
Foreign Communication From A Counterpart Application, Chinese Application No. 201510863976.6, Chinese Office Action dated Mar. 25, 2019, 6 pages.

* cited by examiner

SYNCHRONIZATION OBJECT DETERMINING METHOD, APPARATUS, AND SYSTEM

CROSS-REFERENCE TO RELATED APPLICATION

This application claims priority to Chinese Patent Application No. 201510863976.6, filed on Nov. 30, 2015, which is hereby incorporated by reference in its entirety.

TECHNICAL FIELD

The present disclosure relates to the field of image processing technologies, and in particular, to a synchronization object determining method, apparatus, and system.

BACKGROUND

A virtual reality technology is a computer emulation technology using which a virtual world can be created and experienced. The virtual reality technology uses a computer to generate a simulation environment such that a user is immersed in the environment. In virtual reality, a common application scenario is multi-person coordination or a multi-person game. A great challenge to the multi-person coordination or the multi-person game is how to synchronize multiple terminals. For example, in a multi-person game, all participating terminals are located in one virtual environment, and coordinate with each other and move in the virtual environment. If the terminals are not synchronized, that is, a time difference exists between the terminals, during coordination or game battling, problems such as asynchronous and delayed pictures watched on multiple terminals are caused, thereby affecting user experience.

According to an existing method for synchronizing time between terminals, a problem of which terminal each terminal is to be synchronized with in a multi-terminal synchronization scenario may be resolved. In the method, each terminal executes the following procedure according to a specified period:

Step 1: Determine whether a synchronization time-scale of another terminal is received, and if a synchronization time-scale of another terminal is received, execute step 3, or if a synchronization time-scale of another terminal is not received, execute step 2.

Step 2: Send a synchronization time-scale of this terminal to another terminal, where the synchronization time-scale includes a priority number of this terminal and local time information of this terminal, and end an execution procedure in a current period.

Step 3: Determine whether a priority number of a source terminal included in the received synchronization time-scale is higher than a priority number of this terminal, and if the priority number of the source terminal is higher than the priority number of this terminal, execute step 4, or if the priority number of the source terminal is not higher than the priority number of this terminal, execute step 5.

Step 4: Adjust local time according to time information included in the received synchronization time-scale.

Step 5: Send a synchronization time-scale of this terminal to another terminal, where the synchronization time-scale includes the priority number of the foregoing source terminal and local time information of this terminal, and end an execution procedure in a current period.

In the foregoing synchronization method, when synchronization is performed, only a terminal priority is considered in selecting a synchronization object. However, in an actual application, a time difference may exist between terminals because of impacts of factors such as a network transmission delay, a local buffer, and a difference between user access time points. According to the synchronization method, an excessively large time adjustment range of a terminal may be caused when synchronization is performed, and therefore, a problem of an unsmooth or stalling picture watched on the terminal occurs.

SUMMARY

Embodiments of the present disclosure provide a synchronization object determining method, apparatus, and system to resolve a problem of an unsmooth or stalling picture watched on a terminal in a multi-terminal synchronization scenario due to an excessively large time adjustment range.

According to a first aspect, a synchronization object determining method is provided, where the method includes obtaining, by a synchronization device, status information of a first terminal and status information of a second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, determining, by the synchronization device, a first distance between the first terminal and the second terminal in the display picture according to the location information of the first terminal and the location information of the second terminal, and predicting a second distance between the first terminal and the second terminal after specified duration in the display picture according to the location information, the velocity information, and the acceleration information of the first terminal and the location information, the velocity information, and the acceleration information of the second terminal, and classifying, by the synchronization device, the second terminal as a synchronization object of the first terminal if the first distance is greater than the second distance.

In this application, when synchronization is performed on a terminal, a mobility feature of the terminal is considered. A future status of the terminal is predicted, and a proper synchronization object is dynamically selected for each terminal according to whether a distance between the terminals increases or decreases after specified duration to improve synchronization efficiency and reduce a probability of a relatively large time adjustment range in subsequent synchronization.

With reference to the first aspect, in a first possible implementation manner of the first aspect, the first distance meets a requirement of the following formula:

$$s_{ij} = \sqrt{(x_i-x_j)^2+(y_i-y_j)^2+(z_i-z_j)^2}, \text{ or}$$

$$s_{ij} = \alpha\sqrt{(x_i-x_j)^2+(y_i-y_j)^2+(z_i-z_j)^2}$$

where $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha>1$, the second distance meets a requirement of the following formula:

$$s'_{ij}=\sqrt{(x'_i-x'_j)^2+(y'_i-y'_j)^2+(z'_i-z'_j)^2}, \text{ or}$$

$$s'_{ij}=\alpha\sqrt{(x'_i-x'_j)^2+(y'_i-y'_j)^2+(z'_i-z'_j)^2}$$

where $s'_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, α is the modification parameter when the obstacle exists between the terminals, and α>1, and the location information that is of the terminal after the specified duration and that is predicted by the synchronization device meets a requirement of the following formulas:

$$x'=x+\vec{v}_xT+\tfrac{1}{2}\vec{a}_xT^2$$

$$y'=y+\vec{v}_yT+\tfrac{1}{2}\vec{a}_yT^2$$

$$z'=z+\vec{v}_zT+\tfrac{1}{2}\vec{a}_zT^2$$

where x, y, z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

According to a second aspect, a synchronization object determining method is provided, where the method includes obtaining, by a synchronization device, status information of a first terminal and status information of a second terminal, where the status information includes location information and a distance threshold, and the location information is used to describe a coordinate location of the terminal in a display picture, determining, by the synchronization device, a distance between the first terminal and the second terminal in the display picture according to the location information of the first terminal and the location information of the second terminal, and classifying, by the synchronization device, the second terminal as a synchronization object of the first terminal if the distance is less than the distance threshold of the first terminal.

In this application, when synchronization is performed on a terminal, in coordination participated by multiple terminals, if the terminals are relatively far from each other, the terminals cannot see each other, and an operation of a terminal does not affect vision of another terminal, experience is not affected even though these terminals are not synchronized. On the contrary, if the terminals are relatively close to each other, and the terminals can see each other in a same scenario, asynchronization between the terminals causes a delay problem in coordination, thereby affecting user experience. Therefore, a terminal relatively close to the first terminal is selected from some terminals in a system such be used as a synchronization object of the first terminal such that a quantity of synchronization objects of the first terminal decreases, and a problem of an excessively large time adjustment range in synchronization performed by the first terminal can be avoided.

With reference to the second aspect, in a first possible implementation manner of the second aspect, the distance between the first terminal and the second terminal in the display picture meets a requirement of the following formula:

$$s_{ij}=\sqrt{(x_i-x_j)^2+(y_i-y_j)^2+(z_i-z_j)^2}, \text{ or}$$

$$s_{ij}=\alpha\sqrt{(x_i-x_j)^2+(y_i-y_j)^2+(z_i-z_j)^2}$$

where $s_{ij}$ indicates the distance between the first terminal and the second terminal in the display picture, $(x_i, y_i, z_i)$ indicates the location information of the first terminal, $(x_j, y_j, z_j)$ indicates the location information of the second terminal, α is a modification parameter when an obstacle exists between the terminals, and α>1.

According to a third aspect, a synchronization object determining apparatus is provided, and the synchronization object determining apparatus has functions of implementing the synchronization device in the foregoing method, where the functions may be implemented using hardware, or may be implemented by executing corresponding software by hardware, and the hardware or the software includes one or more modules corresponding to the foregoing functions.

In a possible implementation manner, the synchronization object determining apparatus includes an obtaining unit configured to obtain status information of a first terminal and status information of a second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, a calculation unit configured to determine a first distance between the first terminal and the second terminal in the display picture according to the location information of the first terminal and the location information of the second terminal, and predict a second distance between the first terminal and the second terminal after specified duration in the display picture according to the location information, the velocity information, and the acceleration information of the first terminal and the location information, the velocity information, and the acceleration information of the second terminal, and a processing unit configured to classify the second terminal as a synchronization object of the first terminal if the first distance is greater than the second distance.

In another possible implementation manner, the synchronization object determining apparatus includes a transceiver configured to obtain status information of a first terminal and status information of a second terminal, where the status information includes location information, velocity information, and acceleration information, the location information is used describe a coordinate location of the terminal in a display picture, the velocity information is used to describe a velocity and a velocity direction of the terminal, and the acceleration information is used to describe an acceleration and an acceleration direction of the terminal, and a processor configured to determine a first distance between the first terminal and the second terminal in the display picture according to the location information of the first terminal and the location information of the second terminal, and predict a second distance between the first terminal and the second terminal after specified duration in the display picture according to the location information, the velocity information, and the acceleration information of the first terminal and the location information, the velocity information, and the acceleration information of the second terminal, classify the second terminal as a synchronization object of the first terminal if the first distance is greater than the second distance.

According to a fourth aspect, a synchronization object determining apparatus is provided, and the synchronization object determining apparatus has functions of implementing the synchronization device in the foregoing method, where the functions may be implemented using hardware, or may be implemented by executing corresponding software by hardware, and the hardware or the software includes one or more modules corresponding to the foregoing functions.

In a possible implementation manner, the synchronization object determining apparatus includes an obtaining unit configured to obtain status information of a first terminal and status information of a second terminal, where the status information includes location information and a distance threshold, and the location information is used to describe a coordinate location of the terminal in a display picture, a calculation unit configured to determine a distance between the first terminal and the second terminal in the display picture according to the location information of the first terminal and the location information of the second terminal, and a processing unit configured to classify the second terminal as a synchronization object of the first terminal if the distance is less than the distance threshold of the first terminal.

In another possible implementation manner, the synchronization object determining apparatus includes a transceiver configured to obtain status information of a first terminal and status information of a second terminal, where the status information includes location information and a distance threshold, and the location information is used to describe a coordinate location of the terminal in a display picture, and a processor configured to determine a distance between the first terminal and the second terminal in the display picture according to the location information of the first terminal and the location information of the second terminal, classify the second terminal as a synchronization object of the first terminal if the distance is less than the distance threshold of the first terminal.

According to a fifth aspect, a synchronization object determining system is provided, including a first terminal, at least one second terminal, and a synchronization device, where the first terminal is configured to send status information of the first terminal to the synchronization device, the second terminal is configured to send status information of the second terminal to the synchronization device, and the synchronization device is configured to obtain the status information of the first terminal and the status information of the second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, determine a first distance between the first terminal and the second terminal in the display picture, and predict a second distance between the first terminal and the second terminal after specified duration in the display picture according to the location information, the velocity information, and the acceleration information of the first terminal and the location information, the velocity information, and the acceleration information of the second terminal, and classify the second terminal as a first-type synchronization object of the first terminal if the first distance is greater than the second distance.

With reference to the fifth aspect, in a first possible implementation manner of the fifth aspect, the status information further includes a distance threshold, and that the synchronization device classifies the second terminal as a first-type synchronization object of the first terminal if the first distance is greater than the second distance includes classifying, by the synchronization device, the second terminal as a first-type synchronization object of the first terminal if the first distance is greater than the distance threshold of the first terminal and the first distance is greater than the second distance.

With reference to the fifth aspect or the first possible implementation manner of the fifth aspect, in a second possible implementation manner of the fifth aspect, the first distance meets a requirement of the following formula:

$$s_{ij} = \sqrt{(x_i - x_j)^2 + (y_i - y_j)^2 + (z_i - z_j)^2}, \text{ or}$$

$$s_{ij} = \alpha\sqrt{(x_i - x_j)^2 + (y_i - y_j)^2 + (z_i - z_j)^2}$$

where $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha > 1$, the second distance meets a requirement of the following formula:

$$s'_{ij} = \sqrt{(x'_i - x'_j)^2 + (y'_i - y'_j)^2 + (z'_i - z'_j)^2}, \text{ or}$$

$$s'_{ij} = \alpha\sqrt{(x'_i - x'_j)^2 + (y'_i - y'_j)^2 + (z'_i - z'_j)^2}$$

where $s'_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, $\alpha$ is the modification parameter when the obstacle exists between the terminals, and $\alpha > 1$, and the location information that is of the terminal after the specified duration and that is predicted by the synchronization device meets a requirement of the following formulas:

$$x' = x + \vec{v}_x T + \tfrac{1}{2}\vec{a}_x T^2$$

$$y' = y + \vec{v}_y T + \tfrac{1}{2}\vec{a}_y T^2$$

$$z' = z + \vec{v}_z T + \tfrac{1}{2}\vec{a}_z T^2$$

where x, y, z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

With reference to the first possible implementation manner of the fifth aspect, in a third possible implementation manner of the fifth aspect, the status information further includes time information, where the time information is used to describe time of the terminal in the display picture, and the synchronization device is further configured to determine a progressive time difference between the first terminal and each terminal in first-type synchronization objects of the first terminal, where the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the display picture is not greater than the distance threshold of the first terminal, and determine waiting duration of the first terminal according to a preset synchronization policy and the progressive time difference between the first terminal and each terminal in the first-type synchronization objects, and notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects, or determine jump duration of the first terminal according to a preset synchronization policy and the progressive time difference between the first terminal and each terminal in the first-type synchronization objects, and notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects, where the waiting duration $\Delta t_{i\_wait}$ of the first terminal meets a requirement of the following formula:

$$\Delta t_{i\_wait} = \max(0, \max(\Delta t'_{im})), \forall m, \text{ and}$$

the jump duration $\Delta t_{i\_jump}$ of the first terminal meets a requirement of the following formula $$\Delta t_{i\_jump} = \max(0, -\min(\Delta t'_{im})), \forall m$$

where $$\Delta t'_{im} = \frac{\Delta t_{im}}{n_{im}},$$

and $\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im} = t_i - t_m$, and $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and $n_{im}$ meets a requirement of the following formula:

$$n_{im} = \left\lceil \frac{s_{im} - d_i}{s_{im} - s'_{im}} \right\rceil,$$

and $s_{im}$ indicates the first distance between the first terminal and any terminal in the first-type synchronization objects in the display picture, $s'_{im}$ indicates the second distance between the first terminal and any terminal in the first-type synchronization objects in the display picture, and $d_i$ indicates the distance threshold of the first terminal.

In this application, a progressive time difference is introduced, and therefore, a synchronization process can be extended, that is, one-time synchronization is changed to multiple times of synchronization. As a result, a time adjustment range is relatively small in each-time synchronization, and a problem, such as an unsmooth or stalling picture, caused by a relatively large time adjustment range in subsequent synchronization is avoided.

With reference to the first possible implementation manner of the fifth aspect, in a fourth possible implementation manner of the fifth aspect, the status information further includes time information, where the time information is used to describe time of the terminal in the display picture, and the synchronization device is further configured to classify the second terminal as a second-type synchronization object of the first terminal if the first distance is less than the distance threshold of the first terminal, determine a progressive time difference between the first terminal and each terminal in first-type synchronization objects of the first terminal, where the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the display picture is not greater than the distance threshold of the first terminal, determine an absolute time difference between the first terminal and each terminal in second-type synchronization objects of the first terminal, and determine waiting duration of the first terminal according to a preset synchronization policy, the progressive time difference between the first terminal and each terminal in the first-type synchronization objects, and the absolute time difference between the first terminal and each terminal in the second-type synchronization objects, and notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects and the second-type synchronization objects, or determine jump duration of the first terminal according to a preset synchronization policy, the progressive time difference between the first terminal and each terminal in the first-type synchronization objects, and the absolute time difference between the first terminal and each terminal in the second-type synchronization objects, and notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects and the second-type synchronization objects, where the waiting duration $\Delta t_{i\_wait}$ of the first terminal meets a requirement of the following formula:

$$\Delta t_{i\_wait}=\max(0,\max(\Delta t_{il},\Delta t'_{im})), \forall l, \forall m, \text{ and}$$

the jump duration $\Delta t_{t\_jump}$ of the first terminal meets a requirement of the following formula:

$$\Delta t_{i\_jump}=\max(0,-\min(\Delta t_{il},\Delta t'_{im})), \forall l, \forall m$$

where $\Delta t_{il}=t_i-t_l$, and $\Delta t_{il}$ indicates an absolute time difference between the first terminal and any terminal in the second-type synchronization objects, $t_i$ indicates the time information of the first terminal, and $t_l$ indicates time information of any terminal in the second-type synchronization objects, $$\Delta t'_{im} = \frac{\Delta t_{im}}{n_{im}},$$

and $\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im}=t_i-t_m$, and $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and $n_{im}$ meets a requirement of the following formula:

$$n_{im} = \left\lceil \frac{s_{im} - d_i}{s_{im} - s'_{im}} \right\rceil,$$

and $s_{im}$ indicates the first distance between the first terminal and any terminal in the first-type synchronization objects in the display picture, $s'_{im}$ indicates the second distance between the first terminal and any terminal in the first-type synchronization objects in the display picture, and $d_i$ indicates the distance threshold of the first terminal.

According to a sixth aspect, a synchronization object determining system is provided, including a first terminal and at least one second terminal, where the second terminal is configured to send status information of the second terminal to the first terminal, and the first terminal is configured to obtain status information of the first terminal and status information of the second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, determine a first distance between the first terminal and the second terminal in the display picture, and predict a second distance between the first terminal and the second terminal after specified duration in the display picture according to the location information, the velocity information, and the acceleration information of the first terminal and the location information, the velocity information, and the acceleration information of the second terminal, and classify the second terminal as a first-type synchronization object of the first terminal if the first distance is greater than the second distance.

With reference to the sixth aspect, in a first possible implementation manner of the sixth aspect, the status information further includes a distance threshold, and that the first terminal classifies the second terminal as a first-type synchronization object of the first terminal if the first distance is greater than the second distance includes classifying, by the first terminal, the second terminal as a first-type synchronization object of the first terminal if the first distance is greater than the distance threshold of the first terminal and the first distance is greater than the second distance.

With reference to the sixth aspect or the first possible implementation manner of the sixth aspect, in a second possible implementation manner of the sixth aspect, the first distance meets a requirement of the following formula:

$$s_{ij}=\sqrt{(x_i-x_j)^2+(y_i-y_j)^2+(z_i-z_j)^2}$$

where $s_{ij}$ indicates the first distance, $(x_i, y_i, z_i)$ indicates the location information of the first terminal included in the status information obtained by the first terminal, and $(x_j, y_j, z_j)$ indicates the location information of the second terminal included in the status information obtained by the first terminal, the second distance meets a requirement of the following formula:

$$s'_{ij}=\sqrt{(x'_i-x'_j)^2+(y'_i-y'_j)^2+(z'_i-z'_j)^2}$$

where $s'_{ij}$ indicates the second distance, $(x'_i, y'_i, z'_i)$ indicates location information that is of the first terminal after the specified duration and that is predicted by the first terminal, and $(x'_j, y'_j, z'_j)$ indicates location information that is of the second terminal after the specified duration and that is predicted by the first terminal, and the location information that is of the terminal after the specified duration and that is predicted by the first terminal meets a requirement of the following formulas:

$$x'=x+\vec{v}_xT+\tfrac{1}{2}\vec{a}_xT^2$$

$$y'=y+\vec{v}_yT+\tfrac{1}{2}\vec{a}_yT^2$$

$$z'=z+\vec{v}_zT+\tfrac{1}{2}\vec{a}_zT^2$$

where x, y, z respectively indicate the location information that is of the terminal in three dimensions and that is included in the status information obtained by the first terminal, x', y', z' indicate the location information that is of the terminal in three dimensions after the specified duration and that is predicted by the first terminal, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

With reference to the first possible implementation manner of the sixth aspect, in a third possible implementation manner of the sixth aspect, the status information further includes time information, where the time information is used to describe time of the terminal in the display picture, and the first terminal is further configured to determine a progressive time difference between the first terminal and each terminal in first-type synchronization objects of the first terminal, where the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the display picture is not greater than the distance threshold of the first terminal, and determine waiting duration of the first terminal according to a preset synchronization policy and the progressive time difference between the first terminal and each terminal in the first-type synchronization objects, and notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects, or determine jump duration of the first terminal according to a preset synchronization policy and the progressive time difference between the first terminal and each terminal in the first-type synchronization objects, and notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects, where the waiting duration $\Delta t_{i\_wait}$ of the first terminal meets a requirement of the following formula:

$$\Delta t_{i\_wait} = \max(0, \max(\Delta t'_{im})), \forall m,$$ and the jump duration $\Delta t_{t\_jump}$ of the first terminal meets a requirement of the following formula:

$$\Delta t_{i\_jump} = \max(0, -\min(\Delta t'_{im})), \forall m$$

where $$\Delta t'_{im} = \frac{\Delta t_{im}}{n_{im}},$$

and $\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im} = t_i + t_m$, and $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and $n_{im}$ meets a requirement of the following formula:

$$n_{im} = \left\lceil \frac{s_{im} - d_i}{s_{im} - s'_{im}} \right\rceil,$$

and $s_{im}$ indicates the first distance between the first terminal and any terminal in the first-type synchronization objects in the display picture, $s'_{im}$ indicates the second distance between the first terminal and any terminal in the first-type synchronization objects in the display picture, and $d_i$ indicates the distance threshold of the first terminal.

With reference to the first possible implementation manner of the sixth aspect, in a fourth possible implementation manner of the sixth aspect, the status information further includes time information, where the time information is used to describe time of the terminal in the display picture, and the first terminal is further configured to classify the second terminal as a second-type synchronization object of the first terminal if the first distance is less than the distance threshold of the first terminal, determine a progressive time difference between the first terminal and each terminal in first-type synchronization objects of the first terminal, where the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the display picture is not greater than the distance threshold of the first terminal, determine an absolute time difference between the first terminal and each terminal in second-type synchronization objects of the first terminal, and determine waiting duration of the first terminal according to a preset synchronization policy, the progressive time difference between the first terminal and each terminal in the first-type synchronization objects, and the absolute time difference between the first terminal and each terminal in the second-type synchronization objects, and notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects and the second-type synchronization objects, or determine jump duration of the first terminal according to a preset synchronization policy, the progressive time difference between the first terminal and each terminal in the first-type synchronization objects, and the absolute time difference between the first terminal and each terminal in the second-type synchronization objects, and notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects and the second-type synchronization objects, where the waiting duration $\Delta t_{i\_wait}$ of the first terminal meets a requirement of the following formula:

$$\Delta t_{i\_wait} = \max(0, \max(\Delta t_{il}, \Delta t'_{im})), \forall l, \forall m,$$ and the jump duration $\Delta t_{i\_jump}$ of the first terminal meets a requirement of the following formula:

$$\Delta t_{i\_jump} = \max(0, -\min(\Delta t_{il}, \Delta t'_{im})), \forall l, \forall m$$

where $\Delta t_{il} = t_i - t_l$, and $\Delta t_{il}$ indicates an absolute time difference between the first terminal and any terminal in the second-type synchronization objects, $t_i$ indicates the time information of the first terminal, and $t_l$ indicates time information of any terminal in the second-type synchronization objects, $$\Delta t'_{im} = \frac{\Delta t_{im}}{n_{im}},$$

and $\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im} = t_i - t_m$, and $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and $n_{im}$ meets a requirement of the following formula:

$$n_{im} = \left\lceil \frac{s_{im} - d_i}{s_{im} - s'_{im}} \right\rceil,$$

and $s_{im}$ indicates the first distance between the first terminal and any terminal in the first-type synchronization objects in the display picture, $s'_{im}$ indicates the second distance between the first terminal and any terminal in the first-type synchronization objects in the display picture, and $d_i$ indicates the distance threshold of the first terminal.

According to a seventh aspect, a computer readable storage medium storing one or more programs is provided, where the one or more programs include an instruction, and when a portable electronic device including multiple application programs executes the instruction, the portable electronic device is enabled to execute the method in any implementation manner of the first aspect, the first possible implementation manner of the first aspect, the second aspect, and the first possible implementation manner of the second aspect.

According to the solutions provided in this application, a proper synchronization object is selected for each terminal. Therefore, on the one hand, an objective of synchronization can be achieved, on the other hand, problems of an unsmooth or stalling picture, unnecessary bandwidth consumption, and a decrease in usage time of a device that are caused by excessive synchronization objects can be avoided.

DESCRIPTION OF EMBODIMENTS

Figure 1:
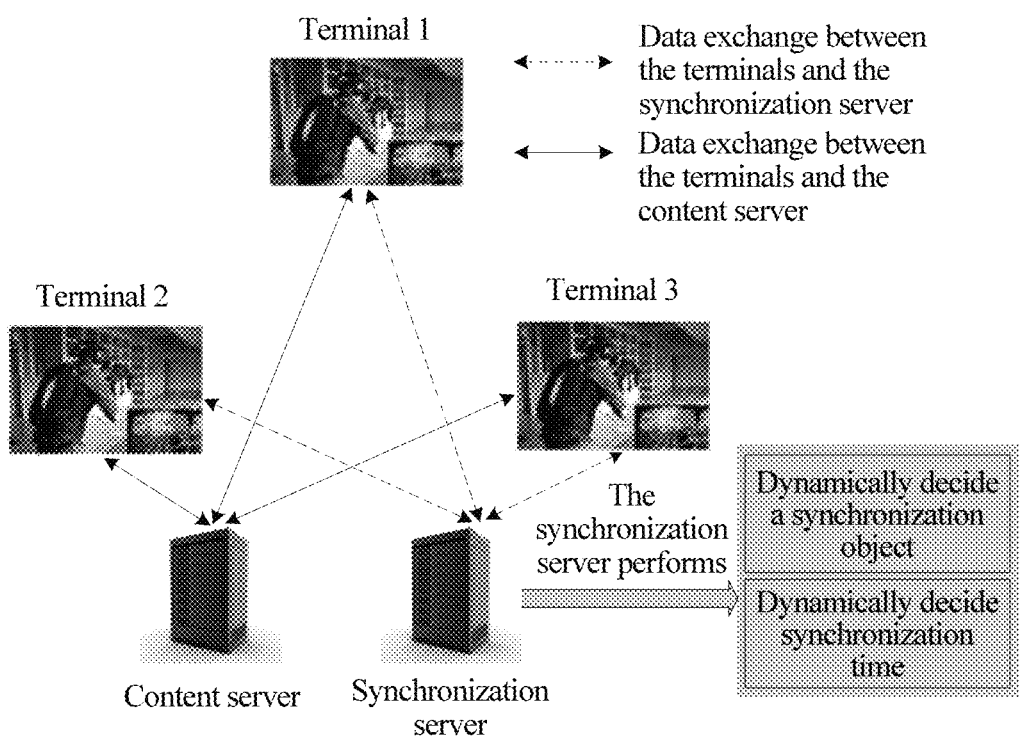
FIG. 1 is a schematic architectural diagram of a first centralized multi-terminal synchronization system according to this application.

In a virtual reality technology, a display picture on a terminal mainly includes two parts one part is a basic picture, which may also be referred to as a scenario picture and is a virtual environment picture that is unrelated to a participating terminal, and the other part is an operation picture, which is a picture of a change that is on the basic picture and caused by an operation of a user, for example, a picture of an explosion that is on a virtual object and caused by a shot operation of a user in a battling game. In the virtual reality technology, a superposition picture of the basic picture and the operation picture is finally presented on the terminal. A time difference, that is, asynchronization, of finally presenting a picture on different terminals may exist because of impacts of factors such as a network transmission delay, a local buffer, and a difference between user access time points. If the terminals interact with each other, such asynchronization severely affects user experience. Therefore, synchronization needs to be performed on related terminals.

However, when synchronization is performed on multiple terminals, selection and classification of a synchronization object are generally not considered in an existing technology. For example, in a multi-person game, if synchronization is required, according to the existing technology, all participating terminals are generally considered as a whole, and the whole are in a synchronization status. However, in an actual application, some problems exist in the synchronization method. When there is a relatively large quantity of participating terminals, on the one hand, a time difference between the participating terminals is relatively large, and if synchronization is directly performed, an excessively large time adjustment range of a terminal may be caused, which may cause. a problem of an unsmooth or stalling picture displayed on the terminal, thereby affecting user experience, on the other hand, if some of the participating terminals do not interact with each other or affect each other, synchronization does not need to be performed on these terminals, while excessive synchronization operations may cause unnecessary bandwidth consumption and a decrease in usage time of a device.

This application provides a synchronization object determining method, apparatus, and system. A proper synchronization object is selected for each terminal. Therefore, on the one hand, an objective of synchronization can be achieved, on the other hand, problems of an unsmooth or stalling display picture, unnecessary bandwidth consumption, and a decrease in usage time of a device that are caused by an excessively large time adjustment range because of excessive synchronization objects can be avoided.

The following describes the technical solutions in the present disclosure with reference to the accompanying drawings and the embodiments in the specification.

The synchronization object determining method provided in this application may be applied to, but is not limited to, a multi-terminal synchronization system in the following two forms A first form is a centralized system.

As shown in FIG. 1, the centralized multi-terminal synchronization system includes a content server, a synchronization server, and some terminals. The content server and the synchronization server are host servers on a cloud side. In the centralized system, there are mainly two types of data exchange one is data exchange between the terminals and the content server, which is referred to as client-content-server data (CCSD), and the other is information exchange between the terminals and the synchronization server, which is referred to as client-synchronization-server data (CSSD). The CCSD mainly refers to an operation and status information of each terminal that are fed back by each terminal to the content server in real time. The content server generates an operation picture according to an operation of the terminal, superposes the operation picture on a corresponding basic picture to generate a composite picture, and then transmits, with reference to status information of the terminal and a request of the terminal, the composite picture or data of the composite picture to the terminal for rendering. The CSSD data is mainly status information of each terminal that is periodically sent from each terminal to the synchronization server. The synchronization server dynamically determines, for each terminal according to the status information, a synchronization object corresponding to each terminal, determines a time adjustment range according to the determined synchronization object, and feeds back the time adjustment range to a corresponding terminal such that each terminal performs a synchronization operation according to a time adjustment range received by each terminal.

A second form is a distributed system.

Figure 2:
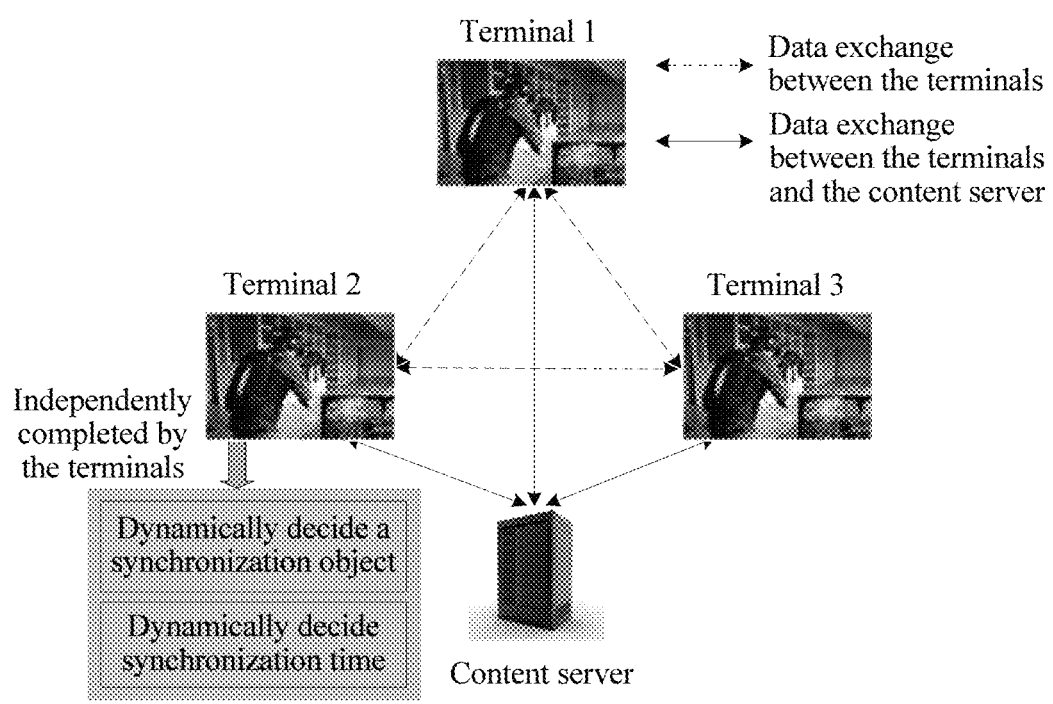
FIG. 2 is a schematic architectural diagram of a second distributed multi-terminal synchronization system according to this application.

As shown in FIG. 2, the distributed multi-terminal synchronization system includes a content server and some terminals. The content server is a host server on a cloud side. In the distributed system, there are mainly two types of data exchange one is data exchange between the terminals and the content server, which is referred to as client-server data (CSD), and the other is data exchange between the terminals, which is referred to as client-client data (CCD). The CSD mainly refers to an operation and status information of each terminal that are fed back by each terminal to the content server in real time. The content server generates an operation picture according to an operation of a terminal, superposes the operation picture on a corresponding basic picture to generate a composite picture, and then transmits, with reference to status information of the terminal and a request of the terminal, the composite picture or data of the composite picture to the terminal for rendering. The CCD is mainly status information of each terminal that is periodically exchanged between the terminals. Each terminal independently determines a synchronization object according to the status information, determines a time adjustment range according to the determined synchronization object, and performs a synchronization operation.

It should be noted that a difference between the centralized system and the distributed system is that in the centralized system, the status information of each terminal is sent to the synchronization server instead of being exchanged between the terminals, and operations such as selection of a synchronization object and calculation of a time adjustment range are also completed on the synchronization server instead of being completed on the terminals.

In an actual application, a content server and a synchronization server may be implemented using a computer, and a terminal may be implemented using a head mounted display (HMD), a mobile phone or a tablet terminal with an acceleration sensor, or the like.

It should be noted that all formulas mentioned in the technical solutions in the present disclosure may have more logical transformations.

Based on the centralized system shown in FIG. 1, the following describes in detail a first synchronization object determining system provided in this application.

The first synchronization object determining system includes a first terminal, at least one second terminal, and a synchronization device. It should be noted that the first terminal mentioned herein refers to any terminal in the some terminals in the centralized system, the second terminal refers to another terminal except the first terminal, and the synchronization device is the foregoing mentioned synchronization server, the first terminal is configured to send status information of the first terminal to the synchronization device, the second terminal is configured to send status information of the second terminal to the synchronization device, and the synchronization device is configured to obtain the status information of the first terminal and the status information of the second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, then determine a first distance between the first terminal and the second terminal in the display picture, and predict a second distance between the first terminal and the second terminal after specified duration in the display picture according to the location information, the velocity information, and the acceleration information of the first terminal and the location information, the velocity information, and the acceleration information of the second terminal, and finally classify the second terminal as a first-type synchronization object of the first terminal if the first distance is greater than the second distance.

Initial location information of the terminal needs to be obtained from the content server by the terminal. Then, when the location information of the terminal is changed by means of a movement operation, the terminal may update the location information according to the movement operation, or the terminal may obtain new location information from the content server.

The velocity information includes a magnitude of the velocity and the velocity direction of the terminal and may be obtained by performing calculus on the acceleration information. The acceleration information includes a magnitude of the acceleration and the acceleration direction of the terminal and may be obtained using an acceleration sensor built in the terminal.

The specified duration may be understood as a synchronization adjustment period preset by the synchronization device itself.

In one embodiment, the synchronization device may measure the first distance and the second distance using a Euclidean distance. In an embodiment, if i is used to represent the first terminal, and j is used to represent the second terminal, the first distance meets a requirement of the following formula:

$$s_{ij} = \sqrt{(x_i-x_j)^2 + (y_i-y_j)^2 + (z_i-z_j)^2} \qquad \text{formula (1)}$$

or $$s_{ij} = \alpha\sqrt{(x_i-x_j)^2 + (y_i-y_j)^2 + (z_i-z_j)^2} \qquad \text{Formula (2)}$$

where $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha > 1$.

In one embodiment, the second distance meets a requirement of the following formula:

$$s'_{ij} = \sqrt{(x'_i-x'_j)^2 + (y'_i-y'_j)^2 + (z'_i-z'_j)^2} \qquad \text{Formula (3)}$$

or $$s'_{ij} = \alpha\sqrt{(x'_i-x'_j)^2 + (y'_i-y'_j)^2 + (z'_i-z'_j)^2} \qquad \text{Formula (4)}$$

where $s_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, $\alpha$ is the modification parameter when the obstacle exists between the terminals, and $\alpha>1$.

The location information that is of the terminal after the specified duration and that is predicted by the synchronization device meets a requirement of the following formulas $$\begin{cases} x' = x + \vec{v}_x T + \frac{1}{2}\vec{a}_x T^2 \\ y' = y + \vec{v}_y T + \frac{1}{2}\vec{a}_y T^2 \\ z' = z + \vec{v}_z T + \frac{1}{2}\vec{a}_z T^2 \end{cases} \quad \text{Formula (5)}$$

where x, y, z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

Foregoing $(x'^i, y'_i, z'_i)$ may be obtained by substituting $(x_i, y_i, z_i)$ in Formula (5). Likewise, foregoing $(x'_j, y'_j, z'_j)$ may be obtained by substituting $(x_j, y_j, z_j)$ in Formula (5).

In this application, the synchronization device learns structure information of a whole basic picture in advance, including information such as a block relationship between models in a whole virtual scenario, and materials and volumes of the models. Therefore, in a case in which location information of any two terminals is learned, the synchronization device may determine, according to whether a subset is generated between an existing model included in the structure information and a connection line between any two terminals, whether an obstacle exists between the any two terminals, for example, whether a terminal A and a terminal B are blocked by a building or a wall. $\alpha$ may be a specified value, or may be a value selected from multiple specified values by the synchronization device according to a result of foregoing determining.

If the synchronization device determines that no obstacle exists between the first terminal and the second terminal, the first distance meets Formula (1), and the second distance meets Formula (3). On the contrary, if the synchronization device determines that an obstacle exists between the first terminal and the second terminal, the first distance meets Formula (2), and the second distance meets Formula (4).

In one embodiment, the status information may further include a distance threshold. The distance threshold is used to describe an asynchronization tolerance degree of the terminal, that is, when a distance between a terminal and another terminal in the display picture exceeds a distance threshold preset by the terminal, an impact of asynchronization with the another terminal can be ignored. The distance threshold is set by the terminal. Different terminals may use a same distance threshold or different distance thresholds. A terminal may set a distance threshold according to an actual application scenario. For example, a relatively small distance threshold may be set in a game scenario, and a relatively large distance threshold may be set in a medical scenario or in an industrial design scenario.

In one embodiment, when the synchronization device determines whether to classify the second terminal as a synchronization object of the first terminal, in addition to magnitudes of the first distance and the second distance, the distance threshold preset by the first terminal may be further considered. For example, if the first distance is greater than the distance threshold of the first terminal, and the first distance is greater than the second distance, the synchronization device classifies the second terminal as a first-type synchronization object of the first terminal. For another example, if the first distance is less than the distance threshold of the first terminal, the synchronization device may directly classify the second terminal as a second-type synchronization object of the first terminal.

In one embodiment, the status information may further include time information, where the time information is used to describe time of the terminal in the display picture. It should be noted that the time information herein is a virtual concept and is not equivalent to a local clock of the terminal. Initial time information of the terminal needs to be obtained from the content server by the terminal. Then, as time goes by, the terminal may update the time information, or the terminal may further obtain new time information from the content server.

In one embodiment, after the synchronization device classifies the second terminal as a first-type or a second-type synchronization object of the first terminal, there may be, but not limited to, the following two manners in which the synchronization device further determines a time adjustment range of the first terminal according to status information of a synchronization object of the first terminal In a first manner, a time adjustment range is determined according to an absolute time difference.

The following uses an example in which synchronization objects of the first terminal include only first-type synchronization objects to describe how to perform synchronization on the first terminal according to an absolute time difference.

First step: Determine an absolute time difference between the first terminal and each terminal in the first-type synchronization objects of the first terminal, where the absolute time difference is a difference value of the time information.

If i is used to represent the first terminal, and m is used to represent any terminal in the first-type synchronization objects, an absolute time difference between the first terminal and any terminal in the first-type synchronization objects meets a requirement of the following formula $$\Delta t_{im} = t_i - t_m \quad \text{Formula (6)}$$

where $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects.

If $\Delta t_{im}>0$, it may be understood that time of the first terminal is earlier than that of the compared terminal. If $\Delta t_{im}<0$, it may be understood that time of the first terminal is later than that of the compared terminal.

Second step: Determine waiting duration or jump duration of the first terminal according to a preset synchronization policy and the absolute time difference between the first terminal and each terminal in the first-type synchronization objects.

In this application, the synchronization policy includes waiting-type synchronization and jump-type synchronization. The terminals in the system may agree on a synchronization policy in advance.

The waiting-type synchronization indicates that the first terminal waits for particular duration by means of a suspension operation to be synchronized with a terminal with the latest time in the synchronization objects of the first terminal. If the time of the first terminal is later than that of all terminals in the synchronization objects of the first terminal, the first terminal does not need to wait. Therefore, the waiting duration of the first terminal meets a requirement of the following formula:

$$\Delta t_{i\_wait} = \max(0, \max(\Delta t_{im})), \forall m \qquad \text{Formula (7)}$$

where $\Delta t_{i\_wait}$ indicates the waiting duration of the first terminal, for definitions of m and $\Delta t_{im}$, reference may be made to Formula (6), max( ) indicates acquisition of a maximum value performed on a value in the round brackets, and $\forall$ is a universal quantifier in discrete symbols and indicates a meaning of "any".

For example, assuming that an absolute time difference between a terminal A and a terminal B and that between the terminal A and a terminal C are respectively 1 second (unit s) and −2 s, the terminal B is a terminal with the latest time in the terminals, and the terminal A and the terminal C need to keep synchronization with the terminal B. According to Formula (7), it can be learned that the terminal A needs to wait 1 s, and the terminal C needs to wait 3 s.

The jump-type synchronization means that the first terminal jumps forwards for particular duration by means of a jump operation to be synchronized with a terminal with the earliest time in the synchronization objects of the first terminal. If the time of the first terminal is earlier than that of all terminals in the synchronization objects of the first terminal, the first terminal does not need to jump. Therefore, the jump duration of the first terminal meets a requirement of the following formula:

$$\Delta t_{i\_jump} = \max(0, -\min(\Delta t_{im})), \forall m \qquad \text{Formula (8)}$$

where $\Delta t_{i\_jump}$ indicates the jump duration of the first terminal, for definitions of m and $\Delta t_{im}$, reference may be made to Formula (6), and min( ) indicates acquisition of a minimum value performed on a value in the round brackets.

For example, assuming that an absolute time difference between a terminal A and a terminal B and that between the terminal A and a terminal C are respectively 1 s and −2 s, if the jump-type synchronization is used, the terminal C is the terminal with the earliest time in the terminals, and the terminal A and the terminal B need to keep synchronization with the terminal C. According to Formula (8), it can be learned that the terminal A needs to jump for 2 s, and the terminal B needs to jump for 3 s.

Third step If waiting-type synchronization is used, notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects, or if jump-type synchronization is used, notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects.

In the first manner, a time adjustment range for synchronization is determined mainly according to time information of each terminal.

In a second manner, a time adjustment range is determined according to a progressive time difference.

The following uses an example in which synchronization objects of the first terminal include only first-type synchronization objects to describe how to perform synchronization on the first terminal according to a progressive time difference.

First step: Determine a progressive time difference between the first terminal and each terminal in the first-type synchronization objects of the first terminal.

For the first-type synchronization object, the progressive time difference may be understood as $$\frac{1}{n_{im}}$$

of an absolute time difference. The absolute time difference is a difference value of the time information, and $n_{im}$ is a maximum quantity of passed specified duration when a distance between any terminal in the first-type synchronization objects and the first terminal in the display picture is not greater than the distance threshold of the first terminal. For a definition of the specified duration, reference may be made to Formula (5).

The progressive time difference is that an absolute time difference between the first terminal and any terminal in the first-type synchronization objects is allocated for multiple times of synchronization to make a time difference in each-time synchronization as small as possible.

If i is used to represent the first terminal, and m is used to represent any terminal in the first-type synchronization objects, a progressive time difference between the first terminal and any terminal in the first-type synchronization objects meets a requirement of the following formula:

$$\Delta t'_{im} = \frac{\Delta t_{im}}{n_{im}} \qquad \text{Formula (9)}$$

where $\Delta t'_{im}$ indicates the progressive time difference between the first terminal and any terminal in the first-type synchronization objects, and $\Delta t_{im}$ indicates an absolute time difference between the first terminal and any terminal in the first-type synchronization objects, and for calculation of $\Delta t_{im}$, reference may be made to Formula (6).

$n_{im}$ is referred to as a quantity of synchronization times and meets a requirement of the following formula:

$$n_{im} = \left\lceil \frac{s_{im} - d_i}{s_{im} - s'_{im}} \right\rceil \qquad \text{Formula (10)}$$

where $s_{im}$ indicates the first distance between the first terminal and any terminal in the first-type synchronization objects in the display picture, and for calculation of $s_{im}$, reference may be made to Formula (1) or Formula (2), $s'_{im}$ indicates a second distance between the first terminal and any terminal in the first-type synchronization objects in the display picture, and for calculation of $s'_{im}$, reference may be made to Formula (3) or Formula (4), $d_i$ indicates the distance threshold of the first terminal, and $$\left\lceil \frac{s_{im} - d_i}{s_{im} - s'_{im}} \right\rceil$$

represents round-up of $$\frac{s_{im} - d_i}{s_{im} - s'_{im}}.$$

Second step Determine waiting duration or jump duration of the first terminal according to a preset synchronization policy and the progressive time difference between the first terminal and each terminal in the first-type synchronization objects.

In an embodiment, if waiting-type synchronization is used, the waiting duration of the first terminal meets a requirement of the following formula:

$$\Delta t_{i\_wait} = \max(0, \max(\Delta t'_{im})), \forall m \quad \text{Formula (11)}$$

where $\Delta t_{i\_wait}$ indicates the waiting duration of the first terminal, and for definitions of m and $\Delta t'_{im}$, reference may be made to Formula (8).

If jump-type synchronization is used, the jump duration of the first terminal meets a requirement of the following formula $$\Delta t_{i\_jump} = \max(0, -\min(\Delta t'_{im})), \forall m \quad \text{Formula (12)}$$

where $\Delta t_{i\_jump}$ indicates the jump duration of the first terminal, and for definitions of m and $\Delta t'_{im}$, reference may be made to Formula (8).

Third step: If waiting-type synchronization is used, notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects, or if jump-type synchronization is used, notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects.

In the second manner, when a time adjustment range for synchronization is determined, in addition to time information of each terminal, dynamic features such as a velocity and an acceleration of each terminal are also considered. When the terminals are relatively far from each other, and the terminals slightly affect each other or even do not affect each other, a synchronization process can be extended, that is, one-time synchronization is changed to multiple times of synchronization to make a time adjustment range as small as possible in each-time synchronization. Therefore, a problem such as an unsmooth or stalling picture caused by a relatively large time adjustment range in subsequent synchronization is avoided.

In addition, if the synchronization objects of the first terminal not only include the first-type synchronization objects, but also includes second-type synchronization objects, when the time adjustment range of the first terminal is determined, in addition to the absolute time difference or the progressive time difference between the first terminal and each terminal in the first-type synchronization objects, an absolute time difference or a progressive time difference between the first terminal and each terminal in the second-type synchronization objects is considered.

If i is used to represent the first terminal, and l is used to represent any terminal in the second-type synchronization objects, the absolute time difference between the first terminal and each terminal in the second-type synchronization objects of the first terminal meets a requirement of the following formula:

$$\Delta t_{il} = t_i - t_l \quad \text{Formula (13)}$$

where $\Delta t_{il}$ indicates an absolute time difference between the first terminal and any terminal in the second-type synchronization objects, $t_i$ indicates the time information of the first terminal, and $t_l$ indicates time information of any terminal in the second-type synchronization objects.

The progressive time difference between the first terminal and each terminal in the second-type synchronization objects of the first terminal meets a requirement of the following formulas:

$$\begin{cases} \Delta t'_{il} = \dfrac{\Delta t_{il}}{n_{il}} \\ n_{il} = \left\lceil \dfrac{s_{il} - d'_i}{s_{il} - s'_{il}} \right\rceil \end{cases} \quad \text{Formula (14)}$$

where $s_{il}$ indicates the first distance between the first terminal and any terminal in the second-type synchronization objects in the display picture, and for calculation of $s_{il}$, reference may be made to Formula (1) or Formula (2), $s'_{il}$ indicates the second distance between the first terminal and any terminal in the second-type synchronization objects in the display picture, and for calculation of $s'_{il}$, reference may be made to Formula (3) or Formula (4), and $d'_i$ indicates another distance threshold set by the first terminal, and $d'_i$ is not greater than the first distance between the first terminal and any terminal in the second-type synchronization objects in the display picture.

The following uses a progressive time difference between the first terminal and each terminal in the first-type synchronization objects and an absolute time difference between the first terminal and each terminal in the second-type synchronization objects as examples to describe how to perform synchronization on the first terminal according to the first-type synchronization objects and the second-type synchronization objects of the first terminal.

First step: Determine the progressive time difference between the first terminal and each terminal in the first-type synchronization objects of the first terminal.

Second step: Determine the absolute time difference between the first terminal and each terminal in the second-type synchronization objects of the first terminal.

Third step: Determine waiting duration or jump duration of the first terminal according to a preset synchronization policy, the progressive time difference between the first terminal and each terminal in the first-type synchronization objects, and the absolute time difference between the first terminal and each terminal in the second-type synchronization objects.

In an embodiment, if waiting-type synchronization is used, the waiting duration of the first terminal meets a requirement of the following formula:

$$\Delta t_{i\_wait} = \max(0, \max(\Delta t_{il}, \Delta t'_{im})), \forall l, \forall m \quad \text{Formula (15)}$$

where $\Delta t_{i\_wait}$ indicates the waiting duration of the first terminal, for definitions of m and $\Delta t'_{im}$, reference may be made to Formula (8), and for definitions of l and $\Delta t_{il}$, reference may be made to Formula (12).

If jump-type synchronization is used, the jump duration of the first terminal meets a requirement of the following formula:

$$\Delta t_{i\_jump} = \max(0, -\min(\Delta t_{il}, \Delta t'_{im})), \forall l, \forall m \qquad \text{Formula (16)}$$

where $\Delta t_{i\_jump}$ indicates the jump duration of the first terminal, for definitions of m and $\Delta t'_{im}$, reference may be made to Formula (8), and for definitions of l and $\Delta t_{il}$, reference may be made to Formula (12).

Fourth step: If waiting-type synchronization is used, notify the first terminal of the waiting duration to instruct the first terminal to suspend the time of the first terminal in the display picture for the waiting duration such that a display picture on the first terminal keeps consistent with a display picture on a terminal with the latest time in the first-type synchronization objects and the second-type synchronization objects, or if jump-type synchronization is used, notify the first terminal of the jump duration to instruct the first terminal to jump the time of the first terminal in the display picture forwards for the jump duration such that a display picture on the first terminal keeps consistent with a display picture on a terminal with the earliest time in the first-type synchronization objects and the second-type synchronization objects.

Based on the distributed system shown in FIG. 2, the following briefly describes a second synchronization object determining system provided in this application.

The second synchronization object determining system includes a first terminal and at least one second terminal. It should be noted that the first terminal mentioned herein refers to any terminal in the some terminals in the distributed system, and the second terminal refers to another terminal except the first terminal.

The second terminal is configured to send status information of the second terminal to the first terminal.

The first terminal is configured to obtain status information of the first terminal and status information of the second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, then determine a first distance between the first terminal and the second terminal in the display picture, and predict a second distance between the first terminal and the second terminal after specified duration in the display picture according to the location information, the velocity information, and the acceleration information of the first terminal and the location information, the velocity information, and the acceleration information of the second terminal, and finally classify the second terminal as a first-type synchronization object of the first terminal if the first distance is greater than the second distance.

In one embodiment, the first terminal may measure the first distance and the second distance using a Euclidean distance. The first distance meets a requirement of the following formula:

$$s_{ij} = \sqrt{(x_i - x_j)^2 + (y_i - y_j)^2 + (z_i - z_j)^2} \qquad \text{Formula (17)}$$

where $s_{ij}$ indicates the first distance, $(x_i, y_i, z_i)$ indicates the location information of the first terminal included in the status information obtained by the first terminal, and $(x_j, y_j, z_j)$ indicates the location information of the second terminal included in the status information obtained by the first terminal.

In one embodiment, the second distance meets a requirement of the following formula:

$$s'_{ij} = \sqrt{(x'_i - x'_j)^2 + (y'_i - y'_j)^2 + (z'_i - z'_j)^2} \qquad \text{Formula (18)}$$

where $s'_{ij}$ indicates the second distance, $(x'_i, y'_i, z'_i)$ indicates location information that is of the first terminal after the specified duration and that is predicted by the first terminal, and $(x'_j, y'_j, z'_j)$ indicates location information that is of the second terminal after the specified duration and that is predicted by the first terminal.

The location information that is of the terminal after the specified duration and that is predicted by the first terminal meets a requirement of the following formulas:

$$\begin{cases} x' = x + \vec{v}_x T + \dfrac{1}{2} \vec{a}_x T^2 \\ y' = y + \vec{v}_y T + \dfrac{1}{2} \vec{a}_y T^2 \\ z' = z + \vec{v}_z T + \dfrac{1}{2} \vec{a}_z T^2 \end{cases} \qquad \text{Formula (19)}$$

where x, y, z respectively indicate the location information that is of the terminal in three dimensions and that is included in the status information obtained by the first terminal, x', y', z' indicate the location information that is of the terminal in three dimensions after the specified duration and that is predicted by the first terminal, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

Foregoing $(x'_i, y'_i, z'_i)$ may be obtained by substituting $(x_i, y_i, z_i)$ in Formula (18). Likewise, foregoing $(x'_j, y'_j, z'_j)$ may be obtained by substituting $(x_j, y_j, z_j)$ in Formula (18).

It should be noted that the first terminal does not learn structure information of a whole basic picture, and therefore, α that is used by the synchronization device in the foregoing first synchronization object determining system does not need to be used to modify a distance between the first terminal and the second terminal in the display picture.

In one embodiment, the status information may further include a distance threshold and time information.

In one embodiment, when the first terminal determines whether to classify the second terminal as a synchronization object of the first terminal, in addition to magnitudes of the first distance and the second distance, the distance threshold preset by the first terminal may be further considered. For example, if the first distance is greater than the distance threshold of the first terminal, and the first distance is greater than the second distance, the first terminal classifies the second terminal as a first-type synchronization object of the first terminal. For another example, if the first distance is less than the distance threshold of the first terminal, the first terminal may directly classify the second terminal as a second-type synchronization object of the first terminal.

After the first terminal classifies the second terminal as a first-type or a second-type synchronization object of the first terminal, there may be, but not limited to, the following two manners in which the first terminal further determines a time adjustment range of the first terminal according to status information of a synchronization object of the first terminal determining a time adjustment range according to an absolute time difference, or determining a time adjustment range according to a progressive time difference. For a specific implementation manner, reference may be made to descriptions of the two manners in the foregoing first synchronization object determining system. For brevity, details are not described herein again.

It should be noted that a difference between the first synchronization object determining system and the second synchronization object determining system is that in the first synchronization object determining system, status information of each terminal is sent to the synchronization device, and operations such as selection of a synchronization object and calculation of a time adjustment range are also completed on a synchronization device, however, in the second synchronization object determining system, status information of each terminal is exchanged between the terminals, and each terminal independently determines a synchronization object and a time adjustment range of each terminal.

For details about the second synchronization object determining system that are not described in this application, reference may be made to descriptions of the foregoing first synchronization object determining system, and details are not described herein again.

Figure 3:
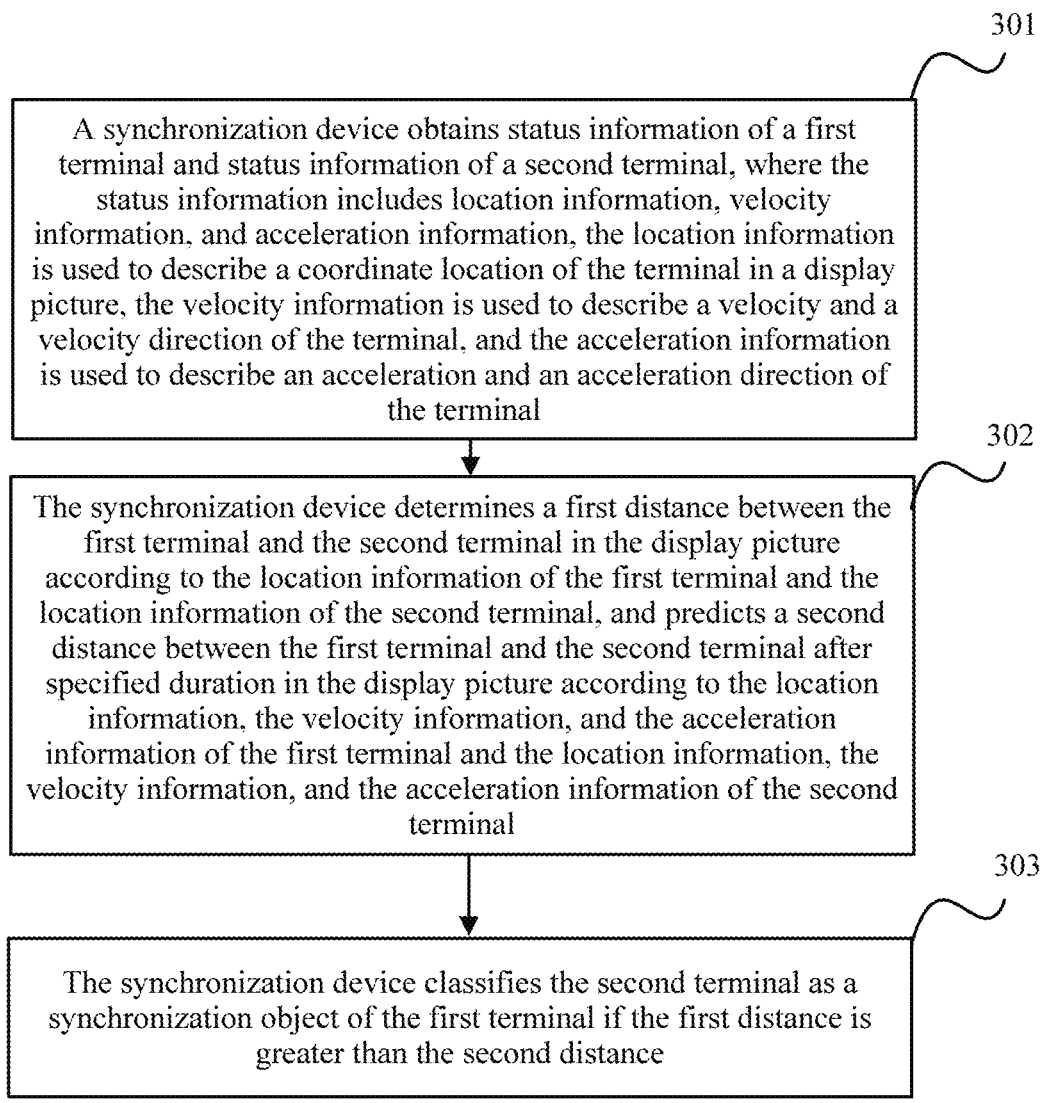
FIG. 3 is a flowchart of a first synchronization object determining method according to this application.

FIG. 3 is a schematic flowchart of a first synchronization object determining method according to this application. The method includes the following steps:

Step 301: A synchronization device obtains status information of a first terminal and status information of a second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal.

Initial location information of the terminal needs to be obtained from a content server. Then, when the terminal moves and changes the location information, the terminal may update the location information according to a movement operation, or the terminal may obtain new location information from the content server.

The velocity information includes a magnitude of the velocity and the velocity direction of the terminal and may be obtained by performing calculus on the acceleration information. The acceleration information includes a magnitude of the acceleration and the acceleration direction of the terminal and may be obtained using an acceleration sensor built in the terminal.

Step 302: The synchronization device determines a first distance between the first terminal and the second terminal in the display picture according to the location information of the first terminal and the location information of the second terminal, and predicts a second distance between the first terminal and the second terminal after specified duration in the display picture according to the location information, the velocity information, and the acceleration information of the first terminal and the location information, the velocity information, and the acceleration information of the second terminal.

In one embodiment, if i is used to represent the first terminal, and j is used to represent the second terminal, the first distance meets a requirement of the following formula:

$$s_{ij}=\sqrt{(x_i-x_j)^2+(y_i-y_j)^2+(z_i-z_j)^2}, \text{ or}$$

$$s_{ij}=\alpha\sqrt{(x_i-x_j)^2+(y_i-y_j)^2+(z_i-z_j)^2}$$

where $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha>1$.

In one embodiment, the second distance meets a requirement of the following formula:

$$s'_{ij}=\sqrt{(x'_i-x'_j)^2+(y'_i-y'_j)^2+(z'_i-z'_j)^2},$$

or $$s'_{ij}=\alpha\sqrt{(x'_i-x'_j)^2+(y'_i-y'_j)^2+(z'_i-z'_j)^2}$$

where $s'_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, $\alpha$ is the modification parameter when the obstacle exists between the terminals, and $\alpha>1$.

The location information that is of the terminal after the specified duration and that is predicted by the synchronization device meets a requirement of the following formulas:

$$\begin{cases} j \in D_1^i & \text{if } \Delta s_{ij} < 0 \\ j \in D_2^i & \text{if } \Delta s_{ij} > 0 \end{cases}.$$

where x, y, z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

Step 303: The synchronization device classifies the second terminal as a synchronization object of the first terminal if the first distance is greater than the second distance.

In an embodiment, after obtaining the first distance and the second distance, the synchronization device may calculate a difference value between the first distance and the second distance, that is:

$$\Delta s_{ij}=s'_{ij}-s_{ij}.$$

When $\Delta s_{ij}<0$, indicates that the first terminal and the second terminal are approaching to each other, and therefore, the second terminal may be added to a terminal set $D_1^i$, or when $\Delta s_{ij}>0$, it indicates that the first terminal and the second terminal are departing from each other, and therefore, the second terminal is added to a terminal set $D_2^i$, that is:

$$\begin{cases} j \in D_1^i & \text{if } \Delta s_{ij} < 0 \\ j \in D_2^i & \text{if } \Delta s_{ij} > 0 \end{cases}.$$

However, when a variation of a distance between the second terminal and the first terminal is zero, the second terminal may be classified into the set $D_1^i$, or may be classified into the set $D_2^i$. Finally, an obtained set $D_1^i$ is synchronization objects of the first terminal.

A terminal in the set $D_2^i$ means that a distance between the terminal and the first terminal may increase in the future. Therefore, when the first terminal performs synchronization, an impact of the terminal in the set $D_2^i$ can be ignored. For a terminal in the set $D_1^i$, because a distance between the terminal and the first terminal is decreasing, the terminal may affect the first terminal in the future, and therefore, when the first terminal performs synchronization, an impact of the terminal in the set $D_1^i$ needs to be considered, and the terminal in the set $D_1^i$ is classified as a synchronization object of the first terminal.

Figure 4:
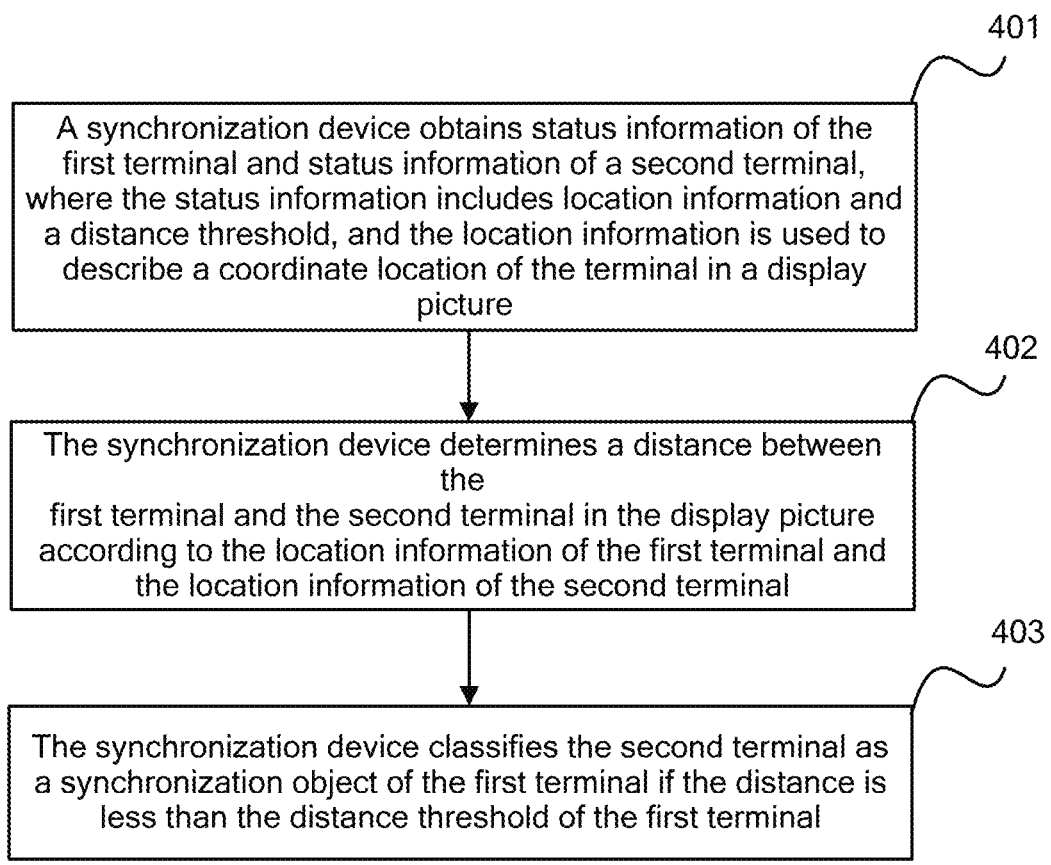
FIG. 4 is a flowchart of a second synchronization object determining method according to this application.

FIG. 4 is a schematic flowchart of a second synchronization object determining method according to this application. The method includes the following steps:

Step 401: A synchronization device obtains status information of a first terminal and status information of a second terminal, where the status information includes location information and a distance threshold, and the location information is used to describe a coordinate location of the terminal in a display picture.

The distance threshold is used to describe an asynchronization tolerance degree of the terminal, that is, when a distance between a terminal and another terminal in the display picture exceeds a distance threshold preset by the terminal, an impact of asynchronization with the another terminal can be ignored. The distance threshold is set by the terminal. Different terminals may use a same distance threshold or different distance thresholds. A terminal may set a distance threshold according to an actual application scenario. For example, a relatively small distance threshold may be set in a game scenario, and a relatively large distance threshold may be set in a medical scenario or in an industrial design scenario.

Step 402: The synchronization device determines a distance between the first terminal and the second terminal in the display picture according to the location information of the first terminal and the location information of the second terminal.

In one embodiment, if i is used to represent the first terminal, and j is used to represent the second terminal, the distance between the first terminal and the second terminal in the display picture meets a requirement of the following formula $$s_{ij} = \sqrt{(x_i-x_j)^2+(y_i-y_j)^2+(z_i-z_j)^2}$$

or $$s_{ij} = \alpha\sqrt{(x_i-x_j)^2+(y_i-y_j)^2+(z_i-z_j)^2}$$

where $s_{ij}$ indicates the distance between the first terminal and the second terminal in the display picture, $(x_i, y_i, z_i)$ indicates the location information of the first terminal, $(x_j, y_j, z_j)$ indicates the location information of the second terminal, $\alpha$ is a modification parameter when an obstacle exists between the terminals, and $\alpha > 1$ Step 403 The synchronization device classifies the second terminal as a synchronization object of the first terminal if the distance is less than the distance threshold of the first terminal.

In this application, the synchronization device may classify, according to the distance threshold preset by the first terminal and the distance between the first terminal and the second terminal in the display picture, another terminal except the first terminal in a system into a set $C_1^i$ of terminals with a relatively short distance to the first terminal and a set $C_2^i$ of terminals with a relatively long distance to the first terminal. In an embodiment, if the distance between the second terminal and the first terminal is less than the distance threshold $d_i$ of the first terminal, the second terminal is added to the set $C_1^i$, or if the distance between the second terminal and the first terminal is greater than $d_i$, the second terminal is added to the set $C_2^i$, that is:

$$\begin{cases} j \in C_1^i & \text{if } d_i > s_{ij} \\ j \in C_2^i & \text{if } d_i < s_{ij} \end{cases}.$$

However, when the distance between the second terminal and the first terminal is equal to $d_i$, the second terminal may be classified into the set $C_1^i$, or may be classified into the set $C_2^i$. Finally, an obtained set $C_1^i$ is synchronization objects of the first terminal.

It should be noted that the foregoing two synchronization object determining methods provided in this application may be used independently, or may be used in a combined manner.

Figure 5:
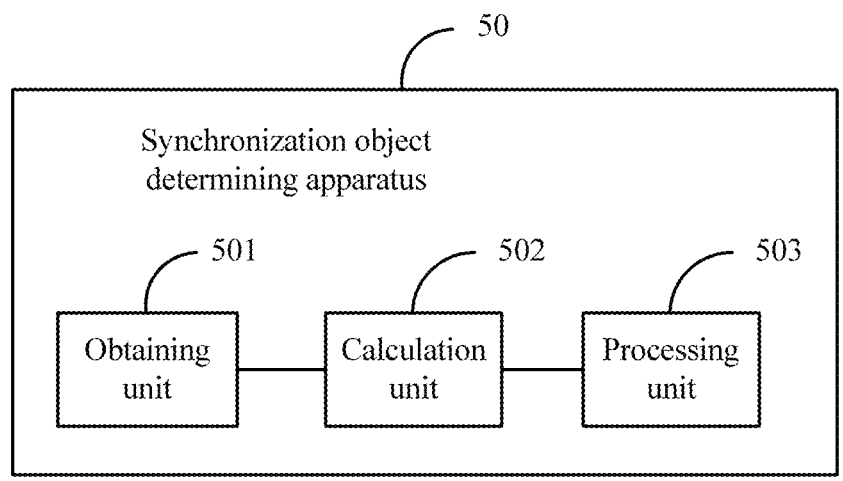
FIG. 5 is a schematic structural diagram of a synchronization object determining apparatus according to this application.

As shown in FIG. 5, this application provides a synchronization object determining apparatus 50, which may be configured to implement the synchronization object determining method shown in FIG. 3 in this application. The apparatus 50 includes an obtaining unit 501 configured to obtain status information of a first terminal and status information of a second terminal, where the status information includes location information, velocity information, and acceleration information, the location information is used to describe a coordinate location of the terminal in a display picture, the velocity information is used to describe a velocity and a velocity direction of the terminal, and the acceleration information is used to describe an acceleration and an acceleration direction of the terminal, a calculation unit 502 configured to determine a first distance between the first terminal and the second terminal in the display picture according to the location information of the first terminal and the location information of the second terminal, and predict a second distance between the first terminal and the second terminal after specified duration in the display picture according to the location information, the velocity information, and the acceleration information of the first terminal and the location information, the velocity information, and the acceleration information of the second terminal, and a processing unit 503 configured to classify the second terminal as a synchronization object of the first terminal if the first distance is greater than the second distance.

In one embodiment, the first distance obtained by the calculation unit 502 meets a requirement of the following formula:

$$s_{ij} = \sqrt{(x_i-x_j)^2+(y_i-y_j)^2+(z_i-z_j)^2}$$

or $$s_{ij} = \alpha\sqrt{(x_i-x_j)^2+(y_i-y_j)^2+(z_i-z_j)^2}$$

where $s_{ij}$ indicates the first distance, $(x_i, y_i, z_i)$ indicates the location information of the first terminal included in the status information obtained by the obtaining unit 501, $(x_j, y_j, z_j)$ indicates the location information of the second terminal included in the status information obtained by the obtaining unit 501, α is a modification parameter when an obstacle exists between the terminals, and α>1.

In one embodiment, the second distance obtained by the calculation unit 502 meets a requirement of the following formula:

$$s'_{ij} = \sqrt{(x'_i - x'_j)^2 + (y'_i - y'_j)^2 + (z'_i - z'_j)^2}$$

or $$s'_{ij} = \alpha \sqrt{(x'_i - x'_j)^2 + (y'_i - y'_j)^2 + (z'_i - z'_j)^2}$$

where $s'_{ij}$ indicates the second distance, $(x'_i, y'_i, z'_i)$ indicates location information that is of the first terminal after the specified duration and that is predicted by the calculation unit 502, $(x'_j, y'_j, z'_j)$ indicates location information that is of the second terminal after the specified duration and that is predicted by the calculation unit 502, α is the modification parameter when the obstacle exists between the terminals, and α>1.

The location information that is of the terminal after the specified duration and that is predicted by the calculation unit 502 meets a requirement of the following formulas:

$$\begin{cases} x' = x + \vec{v}_x T + \frac{1}{2}\vec{a}_x T^2 \\ y' = y + \vec{v}_y T + \frac{1}{2}\vec{a}_y T^2 \\ z' = z + \vec{v}_z T + \frac{1}{2}\vec{a}_z T^2 \end{cases}$$

where x, y, z respectively indicate the location information that is of the terminal in three dimensions and that is included in the status information obtained by the obtaining unit 501, x', y', z' indicate the location information that is of the terminal in three dimensions after the specified duration and that is predicted by the calculation unit 502, T indicates the specified duration, $\vec{v}_x, \vec{v}_y, \vec{v}_z$ indicate the velocity information that is of the terminal in three dimensions and that is included in the status information, and $\vec{a}_x, \vec{a}_y, \vec{a}_z$ indicate the acceleration information that is of the terminal in three dimensions and that is included in the status information.

In one embodiment, the apparatus 50 may be located at the first terminal, or may be located at a synchronization device on a cloud side.

Figure 6:
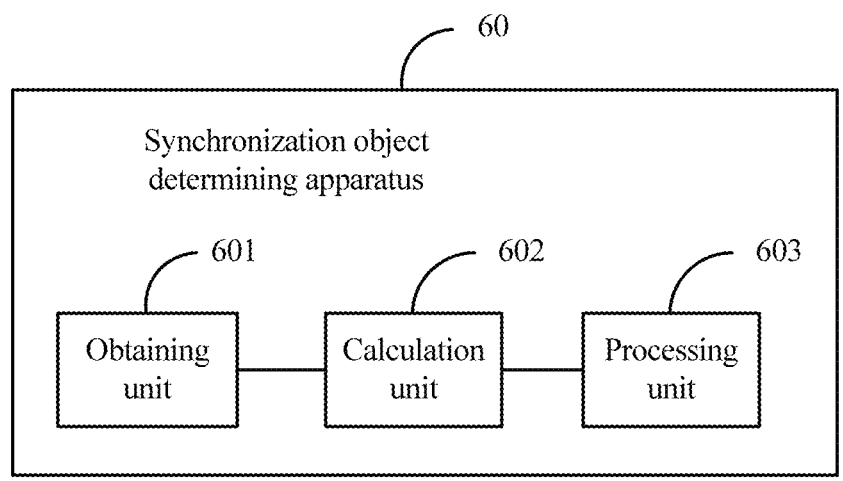
FIG. 6 is a schematic structural diagram of another synchronization object determining apparatus according to this application.

As shown in FIG. 6, this application further provides a synchronization object determining apparatus 60, which may be configured to implement the synchronization object determining method shown in FIG. 4 in this application. The apparatus includes an obtaining unit 601 configured to obtain status information of a first terminal and status information of a second terminal, where the status information includes location information and a distance threshold, and the location information is used to describe a coordinate location of the terminal in a display picture, a calculation unit 602 configured to determine a distance between the first terminal and the second terminal in the display picture according to the location information of the first terminal and the location information of the second terminal, and a processing unit 603 configured to classify the second terminal as a synchronization object of the first terminal if the distance is less than the distance threshold of the first terminal.

In one embodiment, the distance, obtained by the calculation unit 602, between the first terminal and the second terminal in the display picture meets a requirement of the following formula:

$$s_{ij} = \sqrt{(x_i - x_j)^2 + (y_i - y_j)^2 + (z_i - z_j)^2}$$

or $$s_{ij} = \alpha \sqrt{(x_i - x_j)^2 + (y_i - y_j)^2 + (z_i - z_j)^2}$$

where $s_{ij}$ indicates the distance between the first terminal and the second terminal in the display picture, $(x_i, y_i, z_i)$ indicates the location information of the first terminal, $(x_j, y_j, z_j)$ indicates the location information of the second terminal, α is a modification parameter when an obstacle exists between the terminals, and α>1.

In one embodiment, the apparatus 60 may be the first terminal, or may be a synchronization device on a cloud side.

It should be noted that unit division in this application is merely exemplary, is merely logical function division, and may be other division in actual implementation. In addition, functional units in the embodiments of this application may be integrated into one processing unit, or each of the units may exist alone physically, or two or more units are integrated into one unit. The integrated unit may be implemented in a form of hardware, or may be implemented in a form of a software function module.

When the integrated unit may be implemented in a form of hardware, entity hardware corresponding to the obtaining unit 501 and the obtaining unit 601 is a transceiver. An entity hardware device corresponding to the calculation unit 502, the calculation unit 602, the processing unit 503, and the processing unit 603 is a processor.

In addition, this application further provides a computer readable storage medium storing one or more programs, where the one or more programs include an instruction. When a portable electronic device including multiple application programs executes the instruction, the portable electronic device is enabled to execute the synchronization object determining method in any of the foregoing cases.

It should be noted that the technical solutions in the present disclosure are not only applicable to resolving a multi-terminal synchronization problem in virtual reality, but also applicable to another large-scale synchronization scenario, for example, a live broadcast scenario. In these scenarios, a definition of a location of a terminal may be expanded to another expression, for example, latitude and longitude, and estimation of a distance between terminals may be expanded to another calculation method, for example, a method for calculating a distance on a two-dimensional plane or on a spherical surface.

In conclusion, in the technical solutions provided in this application, a mobility feature of a terminal is considered. When synchronization is performed, a future status of the terminal is predicted according to status information of the terminal such as time information, location information, velocity information, acceleration information, and a distance threshold. A proper synchronization object is dynamically selected for each terminal according to whether a distance between the terminals increases or decreases after specified duration. Therefore, on the one hand, an objective of synchronization can be achieved, on the other hand, problems of an unsmooth or stalling picture, unnecessary bandwidth consumption, and a decrease in usage time of a device that are caused by excessive synchronization objects can be avoided to improve synchronization efficiency.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (the system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Persons skilled in the art can make various modifications and variations to the embodiments of the present disclosure without departing from the scope of the embodiments of the present disclosure. The embodiments of the present disclosure are intended to cover these modifications and variations provided that they fall within the scope of protection defined by the following claims and their equivalent technologies.

What is claimed is:

1. A synchronization object determining method, comprising:

obtaining, by a synchronization device, status information of a first terminal and status information of a second terminal, wherein the status information of the first terminal and the status information of the second terminal each comprises location information, velocity information, and acceleration information, wherein the location information is used to describe a virtual coordinate location of the terminal in a displayed virtual environment, wherein the velocity information is used to describe a velocity and a velocity direction of the terminal, and wherein the acceleration information is used to describe an acceleration and an acceleration direction of the terminal;

determining, by the synchronization device, a first distance between the first terminal and the second terminal in the displayed virtual environment according to the location information of the first terminal and the location information of the second terminal;

predicting, by the synchronization device, a second distance between the first terminal and the second terminal after a specified duration in the displayed virtual environment according to the location information, the velocity information, and the acceleration information of the first terminal and the location information, the velocity information, and the acceleration information of the second terminal; and classifying, by the synchronization device, the second terminal as a synchronization object of the first terminal if the first distance is greater than the second distance;

wherein the first distance meets a requirement of at least one of the following formulas:

$$s_{ij} = \sqrt{(x_i - x_j)^2 + (y_i - y_j)^2 + (z_i - z_j)^2}, \text{ or}$$

$$s_{ij} = \alpha\sqrt{(x_i - x_j)^2 + (y_i - y_j)^2 + (z_i - z_j)^2}$$

wherein $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha > 1$, wherein the second distance meets a requirement of the at least one of the following formulas:

$$s'_{ij} = \sqrt{(x'_i - x'_j)^2 + (y'_i - y'_j)^2 + (z'_i - z'_j)^2}, \text{ or}$$

$$s'_{ij} = \alpha\sqrt{(x'_i - x'_j)^2 + (y'_i - y'_j)^2 + (z'_i - z'_j)^2}$$

wherein $s'_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, $\alpha$ is the modification parameter when the obstacle exists between the terminals, and $\alpha > 1$, wherein the location information that is of the first terminal and the second terminal after the specified duration and that is predicted by the synchronization device meets a requirement of at least one of the following formulas:

$$x'=x+\vec{v}_xT+\tfrac{1}{2}\vec{a}_xT^2,$$

$$y'=y+\vec{v}_yT+\tfrac{1}{2}\vec{a}_yT^2, \text{ or}$$

$$z'=z+\vec{v}_zT+\tfrac{1}{2}\vec{a}_zT^2,$$

and wherein x,y,z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x$, $\vec{v}_y$, $\vec{v}_z$ indicates the velocity information that is of the terminal in three dimensions and that is included in the status information, $\vec{a}_x$, $\vec{a}_y$, $\vec{a}_z$ indicates the acceleration information that is of the terminal in three dimensions and that is included in the status information.

2. A synchronization object determining apparatus, comprising:
a processor configured to:
obtain status information of a first terminal and status information of a second terminal, wherein the status information of the first terminal and the status information of the second terminal each comprises location information, velocity information, and acceleration information, wherein the location information is used to describe a virtual coordinate location of the terminal in a displayed virtual environment, wherein the velocity information is used to describe a velocity and a velocity direction of the terminal, and wherein the acceleration information is used to describe an acceleration and an acceleration direction of the terminal;
determine a first distance between the first terminal and the second terminal in the displayed virtual environment according to the location information of the first terminal and the location information of the second terminal;
predict a second distance between the first terminal and the second terminal after a specified duration in the displayed virtual environment according to the location information, the velocity information, and the acceleration information of the first terminal and the location information, the velocity information, and the acceleration information of the second terminal; and
classify the second terminal as a synchronization object of the first terminal if the first distance is greater than the second distance;
wherein the first distance meets a requirement of at least one of the following formulas:

$$s_{ij}=\sqrt{(x_i-x_j)^2+(y_i-y_j)^2+(z_i-z_j)^2}, \text{ or}$$

$$s_{ij}=\alpha\sqrt{(x_i-x_j)^2+(y_i-y_j)^2+(z_i-z_j)^2}$$

wherein $s_{ij}$ indicates the first distance, $(x_i, y_i, z_i)$ indicates the location information of the first terminal included in the status information, $(x_j, y_j, z_j)$ indicates the location information of the second terminal included in the status information, α is a modification parameter when an obstacle exists between the terminals, and α>1, wherein the second distance meets a requirement of at least one of the following formulas:

$$s'_{ij}=\sqrt{(x'_i-x'_j)^2+(y'_i-y'_j)^2+(z'_i-z'_j)^2}, \text{ or}$$

$$s'_{ij}=\alpha\sqrt{(x'_i-x'_j)^2+(y'_i-y'_j)^2+(z'_i-z'_j)^2}$$

wherein $s'_{ij}$ indicates the second distance, $(x'_i, y'_i, z'_i)$ indicates location information that is of the first terminal after the specified duration, $(x'_j, y'_j, z'_j)$ indicates location information that is of the second terminal after the specified duration, α is the modification parameter when the obstacle exists between the terminals, and α>1, wherein the location information that is of the first terminal and the second termianl after the specified duration meets a requirement of at least one of the following formulas:

$$x'=x+\vec{v}_xT+\tfrac{1}{2}\vec{a}_xT^2,$$

$$y'=y+\vec{v}_yT+\tfrac{1}{2}\vec{a}_yT^2, \text{ or}$$

$$z'=z+\vec{v}_zT+\tfrac{1}{2}\vec{a}_zT^2,$$

and wherein x, y, z respectively indicate the location information that is of the terminal in three dimensions and that is included in the status information, x', y', z' indicate the location information that is of the terminal in three dimensions after the specified duration, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

3. A synchronization object determining system, comprising:
a first terminal;
at least one second terminal; and
a synchronization device, wherein the first terminal is configured to send status information of the first terminal to the synchronization device, wherein the second terminal is configured to send status information of the second terminal to the synchronization device, and wherein the synchronization device is configured to:
obtain the status information of the first terminal and the status information of the second terminal, wherein the status information of the first terminal and the status information of the second terminal each comprises location information, velocity information, and acceleration information, wherein the location information is used to describe a virtual coordinate location of the terminal in a displayed virtual environment, wherein the velocity information is used to describe a velocity and a velocity direction of the terminal, and wherein the acceleration information is used to describe an acceleration and an acceleration direction of the terminal;
determine a first distance between the first terminal and the second terminal in the displayed virtual environment;
predict a second distance between the first terminal and the second terminal after a specified duration in the displayed virtual environment according to the location information, the velocity information, and the acceleration information of the first terminal and the location information, the velocity information, and the acceleration information of the second terminal; and
classify the second terminal as a first-type synchronization object of the first terminal if the first distance is greater than the second distance;

wherein the first distance meets a requirement of at least one of the following formulas:

$$s_{ij}=\sqrt{(x_i-x_j)^2+(y_i-y_j)^2+(z_i-z_j)^2}, \text{ or}$$

$$s_{ij}=\alpha\sqrt{(x_i-x_j)^2+(y_i-y_j)^2+(z_i-z_j)^2}$$

wherein $s_{ij}$ indicates the first distance, $(x_i, y_i, z_i)$ indicates the location information of the first terminal included in the status information obtained by the synchronization device, $(x_j, y_j, z_j)$ indicates the location information of the second terminal included in the status information obtained by the synchronization device, $\alpha$ is a modification parameter when an obstacle exists between the terminals, and $\alpha>1$, wherein the second distance meets a requirement of at least one of the following formulas:

$$s'_{ij}=\sqrt{(x'_i-x'_j)^2+(y'_i-y'_j)^2+(z'_i-z'_j)^2}, \text{ or}$$

$$s'_{ij}=\alpha\sqrt{(x'_i-x'_j)^2+(y'_i-y'_j)^2+(z'_i-z'_j)^2}$$

wherein $s'_{ij}$ indicates the second distance, $(x'_i, y'_i, z'_i)$ indicates location information that is of the first terminal after the specified duration and that is predicted by the synchronization device, $(x'_j, y'_j, z'_j)$ indicates location information that is of the second terminal after the specified duration and that is predicted by the synchronization device, $\alpha$ is the modification parameter when the obstacle exists between the terminals, and $\alpha>1$, wherein the location information that is of the terminal after the specified duration and that is predicted by the synchronization device meets a requirement of at least one of the following formulas:

$$x'=x+\vec{v}_xT+\tfrac{1}{2}\vec{a}_xT^2,$$

$$y'=y+\vec{v}_yT+\tfrac{1}{2}\vec{a}_yT^2, \text{ or}$$

$$z'=z+\vec{v}_zT+\tfrac{1}{2}\vec{a}_zT^2,$$

and wherein x, y, z respectively indicate the location information that is of the terminal in three dimensions and that is included in the status information obtained by the synchronization device, x', y', z' indicate the location information that is of the terminal in three dimensions after the specified duration and that is predicted by the synchronization device, T indicates the specified duration, $\vec{v}_x, \vec{v}_y, \vec{v}_z$ indicate the velocity information that is of the terminal in three dimensions and that is included in the status information, and $\vec{a}_x, \vec{a}_y, \vec{a}_z$ indicate the acceleration information that is of the terminal in three dimensions and that is included in the status information.

4. The system according to claim 3, wherein the status information further comprises a distance threshold, and wherein classifying the second terminal as the first-type synchronization object of the first terminal if the first distance is greater than the second distance comprises classifying, by the synchronization device, the second terminal as the first-type synchronization object of the first terminal if the first distance is greater than the distance threshold of the first terminal and the first distance is greater than the second distance.

5. The system according to claim 4, wherein the status information further comprises time information, wherein the time information is used to describe time of the terminal in the displayed virtual environment, and wherein the synchronization device is further configured to:

determine a progressive time difference between the first terminal and each terminal in first-type synchronization objects of the first terminal, wherein the progressive time difference is $$\frac{1}{n_{im}}$$

of an absolute time difference, wherein the absolute time difference is a difference value of the time information, and wherein $n_{im}$ is a maximum quantity of passed specified duration when a distance between any terminal in the first-type synchronization objects and the first terminal in the displayed virtual environment is not greater than the distance threshold of the first terminal; and determine a waiting duration of the first terminal according to a preset synchronization policy and the progressive time difference between the first terminal and each terminal in the first-type synchronization objects; and notify the first terminal of the waiting duration to instruct the first terminal to suspend the time of the first terminal in the displayed virtual environment for the waiting duration such that a virtual environment displayed on the first terminal keeps consistent with a virtual environment displayed on a terminal with the latest time in the first-type synchronization objects; or determine a jump duration of the first terminal according to a preset synchronization policy and the progressive time difference between the first terminal and each terminal in the first-type synchronization objects; and notify the first terminal of the jump duration to instruct the first terminal to jump the time of the first terminal in the displayed virtual environment forwards for the jump duration such that a virtual environment displayed on the first terminal keeps consistent with a virtual environment displayed on a terminal with the earliest time in the first-type synchronization objects, wherein the waiting duration $\Delta t_{i\_wait}$ of the first terminal meets a requirement of the following formula $\Delta t_{i\_wait}=\max(0, \max(\Delta t'_{im}))$, $\forall m$, wherein the jump duration $\Delta t_{i\_jump}$ of the first terminal meets a requirement of the following formula $\Delta t_{i\_jump}=\max(0,-\min(\Delta t'_{im}))$, $\forall m$, wherein $$\Delta t'_{im} = \frac{\Delta t_{im}}{n_{im}},$$

$\Delta t'_{im}$ indicates a progressive time difference between the first terminal and any terminal in the first-type synchronization objects, $\Delta t_{im}$ indicates an absolute time difference between the first terminal and any terminal in the first-type synchronization objects, $\Delta t_{im}=t_i-t_m$, $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and wherein $n_{im}$ meets a requirement of the following formula $$n_{im} = \left\lceil \frac{s_{im} - d_i}{s_{im} - s'_{im}} \right\rceil,$$

$s_{im}$ indicates the first distance between the first terminal and any terminal in the first-type synchronization objects in the displayed virtual environment, $s'_{im}$ indicates the second distance between the first terminal and any terminal in the first-type synchronization objects in the displayed virtual environment, and $d_i$ indicates the distance threshold of the first terminal.

6. The system according to claim 4, wherein the status information further comprises time information, wherein the time information is used to describe time of the terminal in the displayed virtual environment; and wherein the synchronization device is further configured to:
classify the second terminal as a second-type synchronization object of the first terminal if the first distance is less than the distance threshold of the first terminal;
determine a progressive time difference between the first terminal and each terminal in first-type synchronization objects of the first terminal, wherein the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the displayed virtual environment is not greater than the distance threshold of the first terminal;
determine an absolute time difference between the first terminal and each terminal in second-type synchronization objects of the first terminal;
determine a waiting duration of the first terminal according to a preset synchronization policy, the progressive time difference between the first terminal and each terminal in the first-type synchronization objects, and the absolute time difference between the first terminal and each terminal in the second-type synchronization objects; and
notify the first terminal of the waiting duration to instruct the first terminal to suspend the time of the first terminal in the displayed virtual environment for the waiting duration such that a virtual environment displayed on the first terminal keeps consistent with a virtual environment displayed on a terminal with the latest time in the first-type synchronization objects and the second-type synchronization objects; or
determine a jump duration of the first terminal according to a preset synchronization policy, the progressive time difference between the first terminal and each terminal in the first-type synchronization objects, and the absolute time difference between the first terminal and each terminal in the second-type synchronization objects; and
notify the first terminal of the jump duration to instruct the first terminal to jump the time of the first terminal in the displayed virtual environment forwards for the jump duration such that a virtual environment displayed on the first terminal keeps consistent with a virtual environment displayed on a terminal with the earliest time in the first-type synchronization objects and the second-type synchronization objects, wherein the waiting duration $\Delta t_{i\_wait}$ of the first terminal meets a requirement of the following formula $\Delta t_{i\_wait}=\max(0, \max(\Delta t_{il}, \Delta t'_{im}))$, $\forall l$, $\forall m$, and the jump duration $\Delta t_{i\_jump}$ of the first terminal meets a requirement of the following formula $\Delta t_{i\_jump}=\max(0-\min(\Delta t_{il},\Delta t'_{im}))$, $\forall l$, $\forall m$ wherein $\Delta t_{il}=t_i-t_l$, and $\Delta t_{il}$ indicates an absolute time difference between the first terminal and any terminal in the second-type synchronization objects, $t_i$ indicates the time information of the first terminal, and $t_l$ indicates time information of any terminal in the second-type synchronization objects, $$\Delta t'_{im} = \frac{\Delta t_{im}}{n_{im}},$$

and $\Delta t'_{im}$ indicates a progressive time difference between the first terminal and any terminal in the first-type synchronization objects, $\Delta t_{im}$ indicates an absolute time difference between the first terminal and any terminal in the first-type synchronization objects, $\Delta t_{im}=t_i-t_m$, $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects, and wherein $n_{im}$ meets a requirement of the following formula $$n_{im} = \left\lceil \frac{s_{im} - d_i}{s_{im} - s'_{im}} \right\rceil,$$

$s_{im}$ indicates the first distance between the first terminal and any terminal in the first-type synchronization objects in the displayed virtual environment, $s'_{im}$ indicates the second distance between the first terminal and any terminal in the first-type synchronization objects in the displayed virtual environment, and $d_i$ indicates the distance threshold of the first terminal.

7. A synchronization object determining system, comprising:
a first terminal; and
at least one second terminal configured to send status information of the second terminal to the first terminal, wherein the first terminal is configured to:
obtain status information of the first terminal and status information of the second terminal, wherein the status information of the first terminal and the status information of the second terminal each comprises location information, velocity information, and acceleration information, wherein the location information is used to describe a virtual coordinate location of the terminal in a displayed virtual environment, wherein the velocity information is used to describe a velocity and a velocity direction of the terminal, and wherein the acceleration information is used to describe an acceleration and an acceleration direction of the terminal;
determine a first distance between the first terminal and the second terminal in the displayed virtual environment,
predict a second distance between the first terminal and the second terminal after a specified duration in the displayed virtual environment according to the location information, the velocity information, and the acceleration information of the first terminal and the location information, the velocity information, and the acceleration information of the second terminal; and classify the second terminal as a first-type synchronization object of the first terminal if the first distance is greater than the second distance;

wherein the first distance meets a requirement of the following formula $s_{ij}=\sqrt{(x_i-x_j)^2+(y_i-y_j)^2+(z_i-z_j)^2}$, wherein $s_{ij}$ indicates the first distance, $(x_i, y_i, z_i)$ indicates the location information of the first terminal comprised in the status information obtained by the first terminal, and $(x_j, y_j, z_j)$ indicates the location information of the second terminal comprised in the status information obtained by the first terminal, wherein the second distance meets a requirement of the following formula $s'_{ij}=\sqrt{(x'_i-x'_j)^2+(y'_i-y'_j)^2+(z'_i-z'_j)^2}$, wherein $s'_{ij}$ indicates the second distance, $(x'_i, y'_i, z'_i)$ indicates location information that is of the first terminal after the specified duration and that is predicted by the first terminal, and $(x'_j, y'_j, z'_j)$ indicates location information that is of the second terminal after the specified duration and that is predicted by the first terminal, wherein the location information that is of the first terminal and the second terminal after the specified duration and that is predicted by the first terminal meets a requirement of the following formulas:

$x'=x+\vec{v}_x T+\frac{1}{2}\vec{a}_x T^2$, $y'=y+\vec{v}_y T+\frac{1}{2}\vec{a}_y T^2$, or $z'=z+\vec{v}_z T+\frac{1}{2}\vec{a}_z T^2$, and wherein x, y, z respectively indicate the location information that is of the terminal in three dimensions and that is included in the status information obtained by the first terminal, x', y', z' indicate the location information that is of the terminal in three dimensions after the specified duration and that is predicted by the first terminal, T indicates the specified duration, $\vec{v}_x$, $\vec{v}_y$, $\vec{v}_z$ indicate the velocity information that is of the terminal in three dimensions and that is included in the status information, and $\vec{a}_x$, $\vec{a}_y$, $\vec{a}_z$ indicate the acceleration information that is of the terminal in three dimensions and that is included in the status information.

8. The system according to claim 7, wherein the status information further comprises a distance threshold, and wherein classifying the second terminal as a first-type synchronization object of the first terminal if the first distance is greater than the second distance comprises classifying, by the first terminal, the second terminal as the first-type synchronization object of the first terminal if the first distance is greater than the distance threshold of the first terminal and the first distance is greater than the second distance.

9. The system according to claim 8, wherein the status information further comprises time information, wherein the time information is used to describe time of the terminal in the displayed virtual environment, and wherein the first terminal is further configured to:

determine a progressive time difference between the first terminal and each terminal in first-type synchronization objects of the first terminal, wherein the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the displayed virtual environment is not greater than the distance threshold of the first terminal; and determine a waiting duration of the first terminal according to a preset synchronization policy and the progressive time difference between the first terminal and each terminal in the first-type synchronization objects; and notify the first terminal of the waiting duration to instruct the first terminal to suspend the time of the first terminal in the displayed virtual environment for the waiting duration such that a virtual environment displayed on the first terminal keeps consistent with a virtual environment displayed on a terminal with the latest time in the first-type synchronization objects; or determine a jump duration of the first terminal according to a preset synchronization policy and the progressive time difference between the first terminal and each terminal in the first-type synchronization objects; and notify the first terminal of the jump duration to instruct the first terminal to jump the time of the first terminal in the displayed virtual environment forwards for the jump duration, so that a virtual environment displayed on the first terminal keeps consistent with a virtual environment displayed on a terminal with the earliest time in the first-type synchronization objects, wherein the waiting duration $\Delta t_{i\_wait}$ of the first terminal meets a requirement of the following formula $\Delta t_{i\_wait}=\max(0, \max(\Delta t'_{im}))$, $\forall m$ wherein the jump duration $\Delta t_{i\_jump}$ of the first terminal meets a requirement of the following formula $\Delta t_{i\_jump}=\max(0, -\min(\Delta t'_{im}))$, $\forall m$, wherein $$\Delta t'_{im} = \frac{\Delta t_{im}}{n_{im}},$$

$\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im}=t_i-t_m$, $\Delta t_{im}$ indicates the absolute time difference between the first terminal and any terminal in the first-type synchronization objects, $t_i$ indicates the time information of the first terminal, $t_m$ indicates time information of any terminal in the first-type synchronization objects, and wherein $n_{im}$ meets a requirement of the following formula $$n_{im} = \left\lceil \frac{s_{im}-d_i}{s_{im}-s'_{im}} \right\rceil,$$

$s_{im}$ indicates the first distance between the first terminal and any terminal in the first-type synchronization objects in the displayed virtual environment, $s'_{im}$ indicates the second distance between the first terminal and any terminal in the first-type synchronization objects in the displayed virtual environment, and $d_i$ indicates the distance threshold of the first terminal.

10. The system according to claim 8, wherein the status information further comprises time information, wherein the time information is used to describe time of the terminal in the displayed virtual environment, wherein the first terminal is further configured to:

classify the second terminal as a second-type synchronization object of the first terminal if the first distance is less than the distance threshold of the first terminal;

determine a progressive time difference between the first terminal and each terminal in first-type synchronization objects of the first terminal, wherein the progressive time difference is $$\frac{1}{n_{im}}$$

of an absolute time difference, the absolute time difference is a difference value of the time information, and $n_{im}$ is a maximum quantity of passed specified duration when a distance between any terminal in the first-type synchronization objects and the first terminal in the displayed virtual environment is not greater than the distance threshold of the first terminal;

determine an absolute time difference between the first terminal and each terminal in second-type synchronization objects of the first terminal; and determine a waiting duration of the first terminal according to a preset synchronization policy, the progressive time difference between the first terminal and each terminal in the first-type synchronization objects, and the absolute time difference between the first terminal and each terminal in the second-type synchronization objects; and notify the first terminal of the waiting duration to instruct the first terminal to suspend the time of the first terminal in the displayed virtual environment for the waiting duration such that a virtual environment displayed on the first terminal keeps consistent with a virtual environment displayed on a terminal with the latest time in the first-type synchronization objects and the second-type synchronization objects; or determine a jump duration of the first terminal according to a preset synchronization policy, the progressive time difference between the first terminal and each terminal in the first-type synchronization objects, and the absolute time difference between the first terminal and each terminal in the second-type synchronization objects; and notify the first terminal of the jump duration to instruct the first terminal to jump the time of the first terminal in the displayed virtual environment forwards for the jump duration such that a virtual environment displayed on the first terminal keeps consistent with a virtual environment displayed on a terminal with the earliest time in the first-type synchronization objects and the second-type synchronization objects, wherein the waiting duration $\Delta t_{i\_wait}$ of the first terminal meets a requirement of the following formula $\Delta t_{i\_wait} = \max(0, \max(\Delta t_{il}, \Delta t'_{im}))$, $\forall l, \forall m$, wherein the jump duration $\Delta t_{i\_jump}$ of the first terminal meets a requirement of the following formula $\Delta t_{i\_jump} = \max(0, -\min(\Delta t_{il}, \Delta t'_{im}))$, $\forall l, \forall m$, wherein $\Delta t_{il} = t_i - t_l$, $\Delta t_{il}$ indicates an absolute time difference between the first terminal and any terminal in the second-type synchronization objects, $t_i$ indicates the time information of the first terminal, $t_l$ indicates time information of any terminal in the second-type synchronization objects, $$\Delta t'_{im} = \frac{\Delta t_{im}}{n_{im}},$$

$\Delta t'_{im}$ indicates a progressive time difference between the first terminal and any terminal in the first-type synchronization objects, and $\Delta t_{im}$ indicates an absolute time difference between the first terminal and any terminal in the first-type synchronization objects, $\Delta t_{im} = t_i - t_m$, $\Delta t_{im}$ indicates the absolute time difference between the first terminal and any terminal in the first-type synchronization objects, $t_i$ indicates the time information of the first terminal, and $t_m$ indicates time information of any terminal in the first-type synchronization objects; and wherein $n_{im}$ meets a requirement of the following formula $$n_{im} = \left\lceil \frac{s_{im} - d_i}{s_{im} - s'_{im}} \right\rceil,$$

$s_{im}$ indicates the first distance between the first terminal and any terminal in the first-type synchronization objects in the displayed virtual environment, $s'_{im}$ indicates the second distance between the first terminal and any terminal in the first-type synchronization objects in the displayed virtual environment, and $d_i$ indicates the distance threshold of the first terminal.

* * * * *

UNITED STATES PATENT AND TRADEMARK OFFICE
CERTIFICATE OF CORRECTION

PATENT NO. : 10,338,879 B2
APPLICATION NO. : 15/363341
DATED : July 2, 2019
INVENTOR(S) : Chao Zhou and Menghan Zhang Page 1 of 1

It is certified that error appears in the above-identified patent and that said Letters Patent is hereby corrected as shown below:

On the Title Page

Item (30): "2015 1 083976" should read "2015 1 0863976.6"

In the Claims

Claim 6, Column 38, Line 7: should read " $\Delta t_{i\_jump} = \max\left(0, -\min\left(\Delta t_{il}, \Delta t'_{im}\right)\right), \forall l, \forall m$ ,, Signed and Sealed this
Twenty-seventh Day of August, 2019

Andrei Iancu
*Director of the United States Patent and Trademark Office*